United States Patent
Tsuji

(10) Patent No.: US 6,278,512 B1
(45) Date of Patent: *Aug. 21, 2001

(54) ORIGINAL READING DEVICE AND METHOD

(75) Inventor: Junichi Tsuji, Kanagawa (JP)

(73) Assignee: Fuji Photo Film Co., Ltd., Kanaagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,377

(22) Filed: Nov. 22, 1999

(30) Foreign Application Priority Data

Nov. 20, 1998 (JP) ................................. 10-331698

(51) Int. Cl.$^7$ .................................................. G03B 27/52
(52) U.S. Cl. ............................................. 355/40; 355/41
(58) Field of Search ................................ 355/40–41, 50, 355/27–29, 81–82; 358/518, 529, 522, 475; 382/167

(56) References Cited

U.S. PATENT DOCUMENTS 5,991,010 * 11/1999 Nishio ..................................... 355/82
6,091,848 * 7/2000 Yamamoto ............................ 382/162

* cited by examiner

Primary Examiner—Russell Adams
Assistant Examiner—Hung Henry Nguyen
(74) Attorney, Agent, or Firm—Sughrue, Mion, Zinn, Macpeak & Seas, PLLC

(57) ABSTRACT

During preliminary reading, a presser plate is positioned at a position separated from a photographic film. While the photographic film is conveyed by a film carrier, the photographic film is read by an exclusive-use line sensor, within an area sensor, which exclusive-use line sensor is positioned a predetermined distance away from a leading end detecting sensor. During main reading, image frames are read by the entire area sensor while the photographic film is conveyed intermittently in an opposite direction and is stopped.

23 Claims, 18 Drawing Sheets

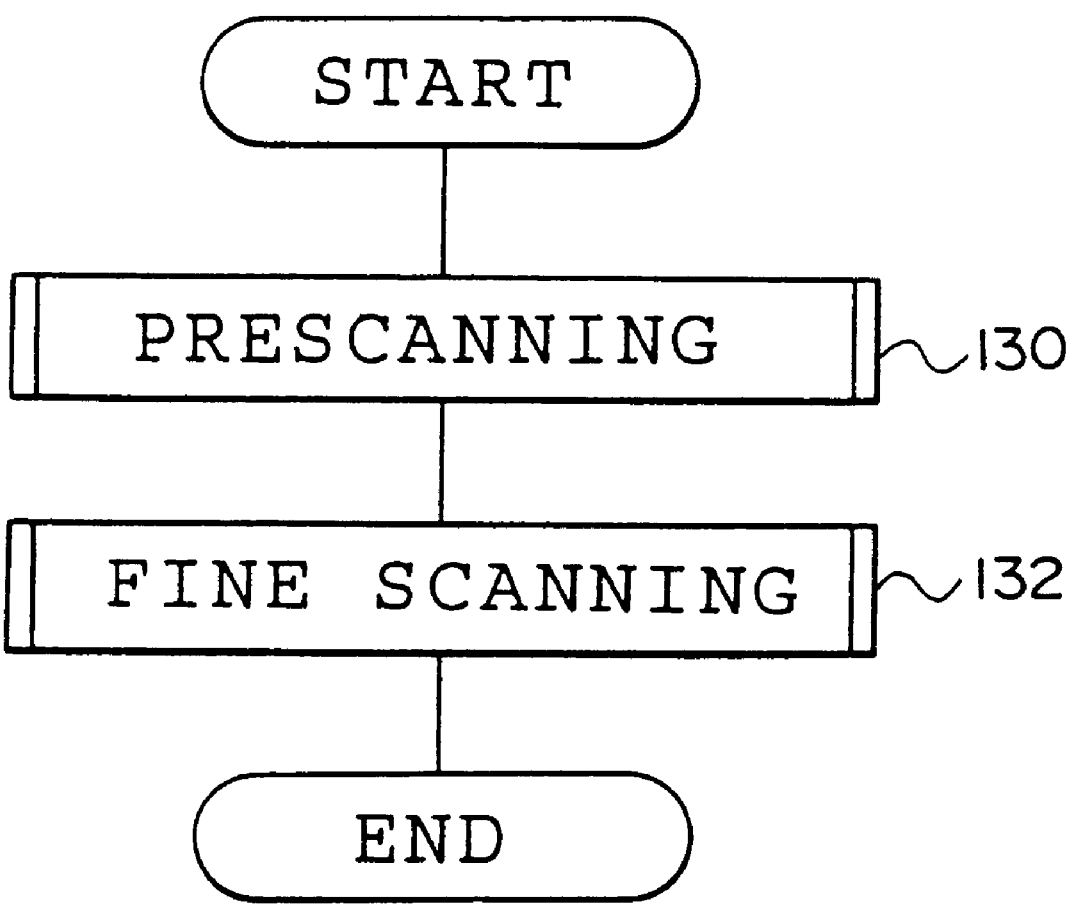

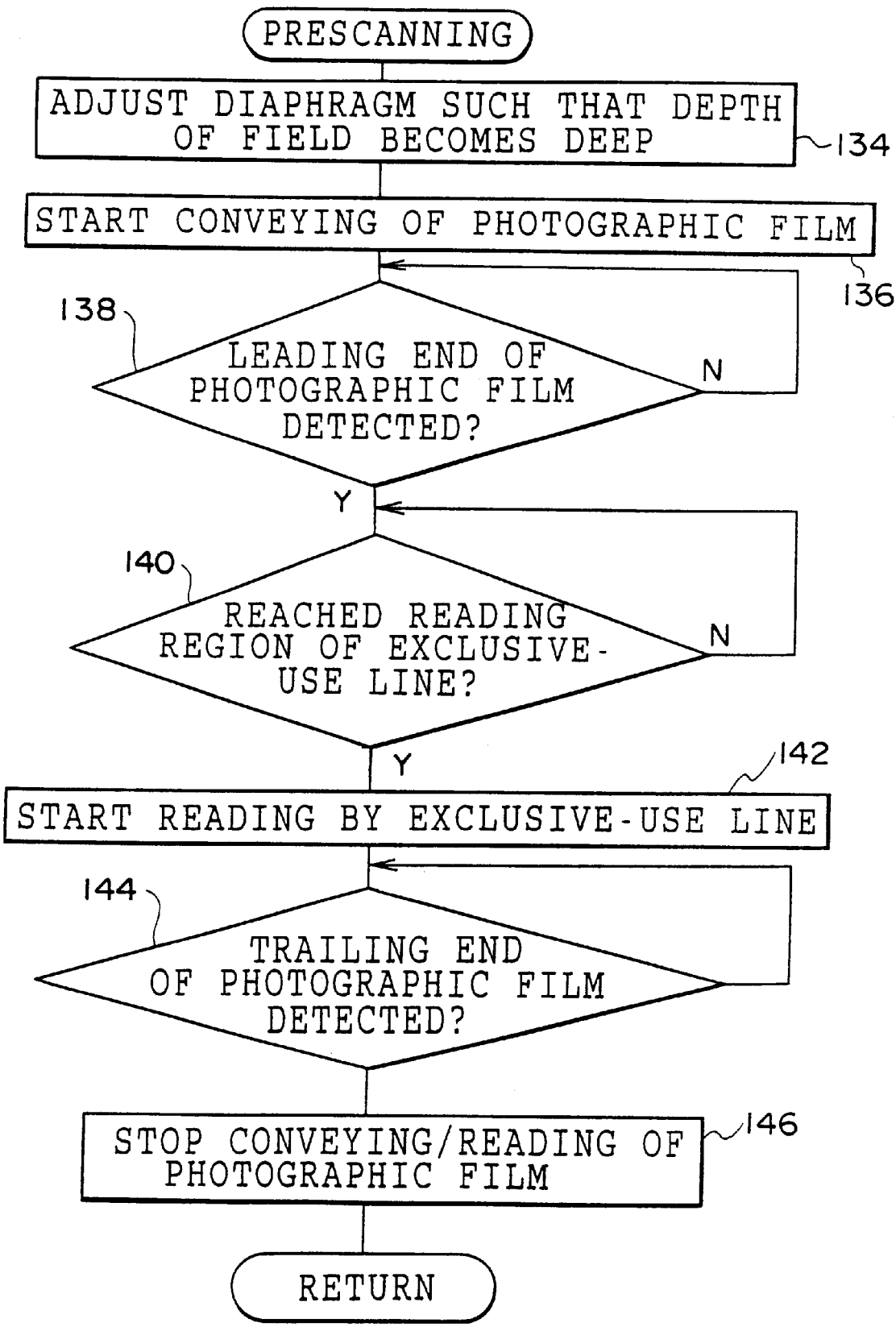

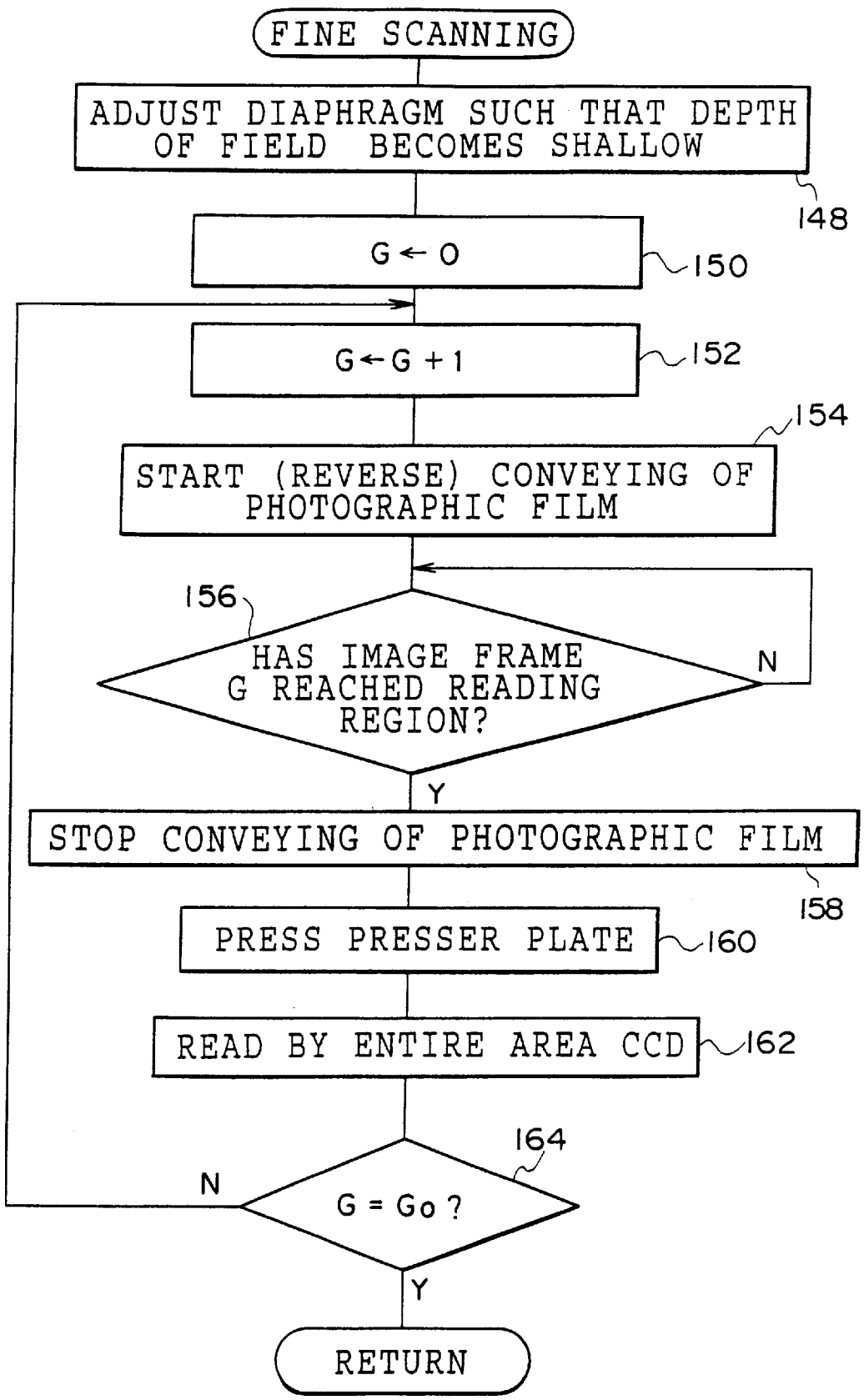

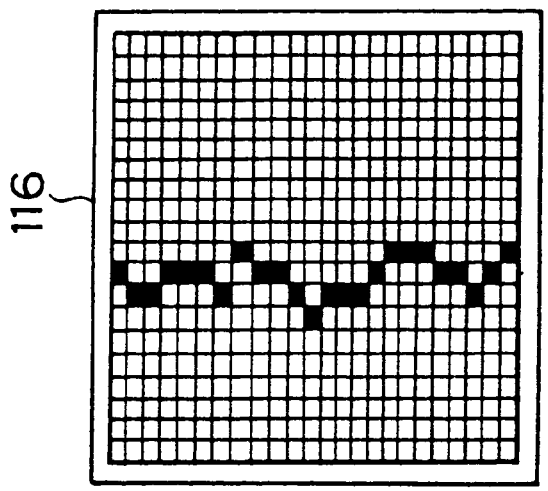
F I G. 13
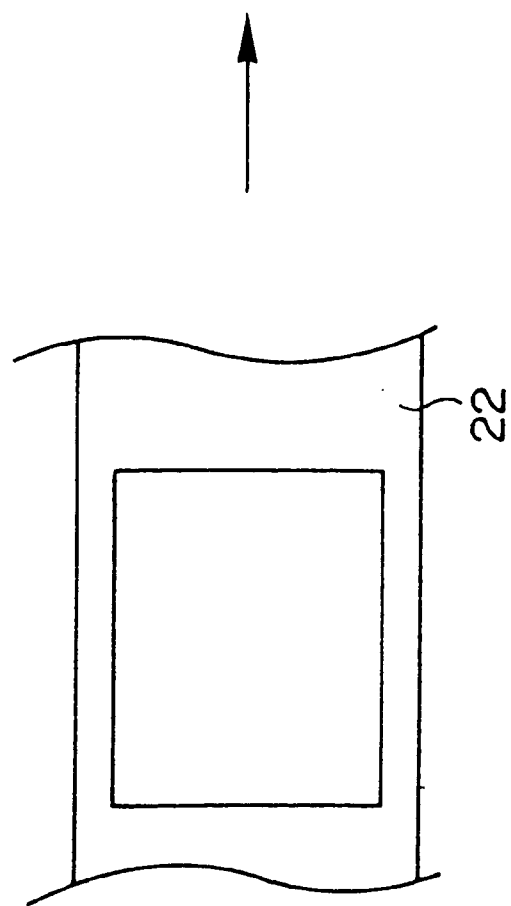

F I G. 1 4
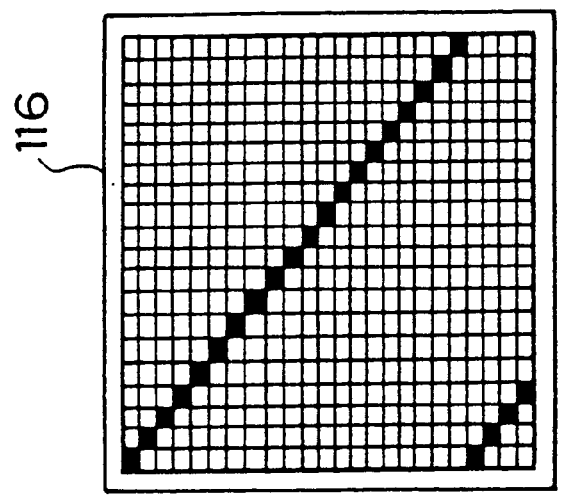
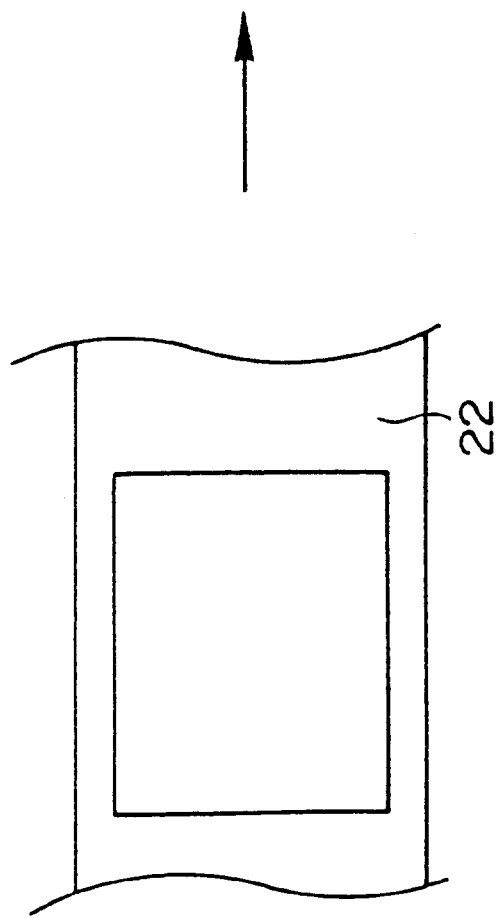

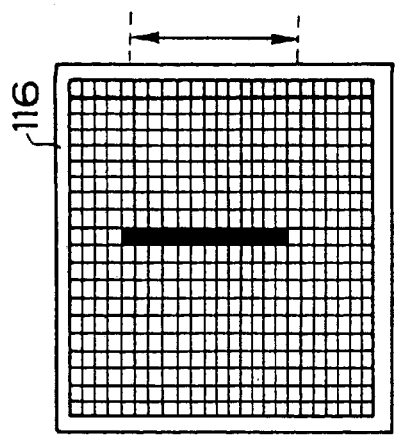
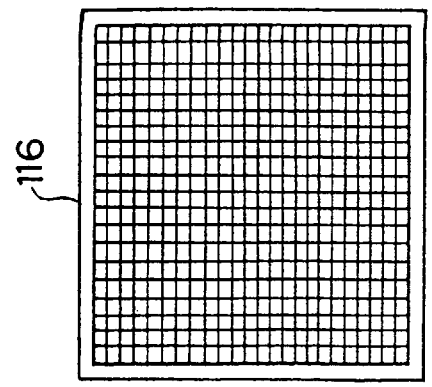
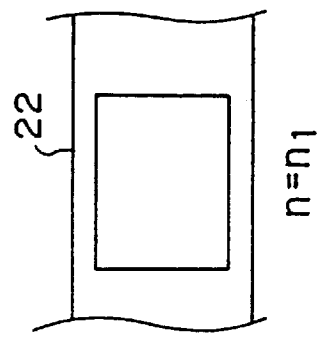
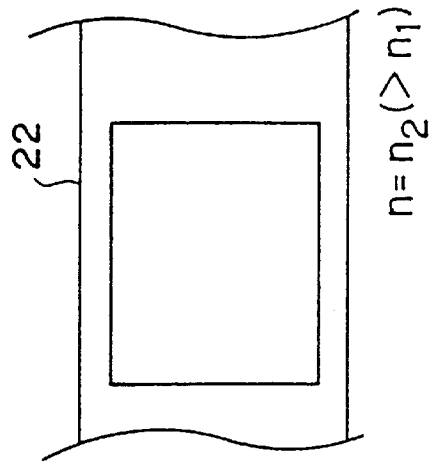
FIG. 18A
FIG. 18B

ORIGINAL READING DEVICE AND METHOD

BACKGROUND OF THE INVENTION

1. Field of the Invention

The present invention relates to an original reading device and method, and in particular, to an original reading device and method in which an original is read by using an area sensor.

2. Description of the Related Art

Japanese Patent Application Laid-Open (JP-A) No. 7-15593 has proposed an image reading device in which a prescan section and a main scan section are provided along the conveying direction of a film. The prescan section roughly reads an image recorded on the film while the film is being conveyed, so as to obtain the basic gist of the image. In accordance with the results of prescanning by the prescan section, the main scan section adjusts the density range, the measurement time and the film conveying speed for image reading, and while the film is conveyed at the adjusted conveying speed, the main scan section reads the image of the film at a high spatial resolution and a high density resolution.

The prescan section has a light source for prescanning, plural conveying roller pairs for conveying the film, a focusing lens, and a linear CCD for prescanning. Further, the main scan section has a light source for main scanning, a filter portion, a light collecting portion, conveying roller pairs, a focusing lens, and a linear CCD for main scanning. Moreover, the scanning/conveying speed in the prescan section is the same speed as or is faster than the maximum speed in the main scan section.

However, because the above-described image reading device is structured such that the prescan section and the fine scan section are provided separately, many parts are required, and the structure of the device is complex.

As described above, the prescan section and the fine scan section are disposed along the conveying direction of the film, and the scanning/conveying speed in the prescan section is the same speed as or is faster than the maximum speed in the main scan section. Therefore, an accumulator or the like for absorbing the slack in the film, which is caused by the difference in speeds between the prescan section and the main scan section, must be provided as needed between a conveying roller pair in the prescan section and a conveying roller pair in the main scan section so that the slack portion of the film is not obstructed.

SUMMARY OF THE INVENTION

In view of the aforementioned, an object of the present invention is to provide an original reading device and method which have a simple structure and do not require consideration of the difference in speeds at the time of preliminary reading and the time of main reading.

A first aspect of the present invention is an original reading device comprising: an original reader which is formed by an arrangement of plural line sensors and which reads an original; a moving device for moving the original and the original reader relatively in a direction in which the plural line sensors are arranged; and a control device for controlling the original reader and the moving device such that preliminary reading of the original is carried out by at least one line sensor among the plural line sensors in a state in which the original and the original reader are being moved relatively and main reading of the original is carried out by the plural line sensors in a state in which the original and the original reader are stopped relatively while being intermittently moved relatively.

In a second aspect of the present invention, the original reading device according to the first aspect further comprises: a focusing lens for focusing the original onto the original reader; an adjusting device for adjusting a depth of field of the focusing lens; and a planarizing device for making planar a reading region of the original read by the original reader, wherein the controlling device controls the adjusting device and the planarizing device such that, during preliminary reading, the depth of field is made deep, and during main reading, the depth of field is made shallow and the reading region is made planar.

In a third aspect of the present invention, the image reading device according the first aspect further comprises: a first planarizing device for making planar a reading region of the original read by at least one line sensor among the plural line sensors; and a second planarizing device for making planar an entire reading region of the original read by the original reader, wherein the control device controls the first planarizing device and the second planarizing device such that, during preliminary reading, the first planarizing device makes planar the reading region read by at least one line sensor among the plural line sensors, and during main reading, the second planarizing device, instead of the first planarizing device, makes planar the entire reading region read by the original reader.

In a fourth aspect of the present invention, in the first aspect, the original is a photographic photosensitive material on which an image frame is formed and at which at least one of a perforation and a bar code which specify the position of the image frame is formed, and the control device effects control such that, during preliminary reading, at least one line sensor among the plural line sensors also reads the at least one of the perforation and the bar code, and during main reading, on the basis of information of the read at least one of the perforation and the bar code, the image frame is positioned at a reading region read by the original reader.

In a fifth aspect of the present invention, in the first aspect, the control device sets in advance at least one line sensor among the plural line sensors to be an exclusive-use line sensor, and during preliminary reading, the original is read by the exclusive-use line sensor.

In a sixth aspect of the present invention, the original reading device according to the fifth aspect further comprises: a leading end detecting sensor which is positioned at an upstream side of the original in a direction of relative movement of the original at the time of preliminary reading, and which detects a leading end of the original wherein a line sensor, which is projected onto a plane of movement of the original at a position separated by a predetermined distance from a projection position of the leading end detecting sensor onto the plane of movement of the original, is set to be the exclusive-use line sensor and the control device controls the original reader such that preliminary reading starts from the time the original moves relatively for the predetermined distance from the time the leading end of the original is detected by the leading end detecting sensor.

A seventh aspect of the present invention is an original reading device comprising: an area sensor formed from plural reading elements; a moving device for moving an original and the area sensor relatively in a predetermined direction of movement; and a control device for controlling the area sensor and the moving device such that the original is subjected to preliminary reading by some of the reading elements of the area sensor in a state in which the original and the area sensor are being moved relatively, and the original is subjected to main reading by the area sensor in a state in which the original and the area sensor are stopped relatively while being intermittently moved relatively.

In an eighth aspect of the present invention, in the seventh aspect, the original reading device further comprises: a first planarizing device for making planar a reading region of the original read by the some of the reading elements of the area sensor; and a second planarizing device for making planar an entire reading region of the original read by the area sensor, wherein the control device controls the first planarizing device and the second planarizing device such that, during preliminary reading, the first planarizing device makes planar the reading region read by the some of the reading elements of the area sensor, and, during main reading, the second planarizing device, instead of the first planarizing device, makes planar the entire reading region read by the area sensor.

In a ninth aspect of the present invention, in either of the seventh or eighth aspects, the original is a photographic photosensitive material on which an image frame is formed and at which at least one of a perforation and a bar code which specify the position of the image frame is formed, and the control device effects control such that, during preliminary reading, the some of the reading elements of the area sensor also read the at least one of the perforation and the bar code, and during main reading, on the basis of information of the read at least one of the perforation and the bar code, the image frame is positioned at a reading region read by the area sensor.

In a tenth aspect of the present invention, in any of the seventh through ninth aspects, the control device sets in advance the some of the reading elements of the area sensor to be exclusive-use reading elements, and during preliminary reading, the original is read by the exclusive-use reading elements.

An eleventh aspect of the present invention is an original reading device comprising: an original reader which is formed by an arrangement of plural line sensors and which reads an original; a moving device for moving the original and the original reader relatively in a direction in which the plural line sensors are arranged; at least one line sensor disposed at a position which is separated from the original reader at an upstream side of movement of the original in a direction of movement by the moving device; a single illuminating device which illuminates light onto a reading region of plural line sensors of the original reader and onto a reading region of the at least one line sensor; and a control device for controlling the original reader and the moving device such that preliminary reading of the original is carried out by the at least one line sensor in a state in which the original and the original reader are being moved relatively, and on the basis of results of preliminary reading, the region preliminarily read by the at least one line sensor is positioned at a reading region of the original reader, and in a state in which the region preliminarily read is positioned at the reading region of the original reader, the original and the original reader are stopped relatively and the region preliminarily read is subjected to main reading by plural line sensors of the original reader.

A twelfth aspect of the present invention is an original reading method of an original reading device which includes an original reader which is formed by an arrangement of plural line sensors and which reads an original, and a moving device for moving the original and the original reader relatively in a direction in which the plural line sensors are arranged, the original reading method comprising the steps of subjecting the original to preliminary reading by at least one line sensor of the plural line sensors in a state in which the original and the original reader are being moved relatively, and subjecting the original to main reading by the plural line sensors in a state in which the original and the original reader are stopped relatively while being intermittently moved relatively.

A thirteenth aspect of the present invention is an original reading method of an original reading device which includes an area sensor which is formed by plural reading elements, and a moving device for moving the original and the area sensor relatively, the original reading method comprising the steps of: subjecting the original to preliminary reading by some of the reading elements of the area sensor in a state in which the original and the area sensor are being moved relatively; and subjecting the original to main reading by the area sensor in a state in which the original and the area sensor are stopped relatively while being intermittently moved relatively.

A fourteenth aspect of the present invention is an original reading method of an original reading device which includes an original reader which is formed by an arrangement of plural line sensors and which reads an original; a moving device for moving the original and the original reader relatively in a direction in which the plural line sensors are arranged; at least one line sensor disposed at a position which is separated from the original reader at an upstream side of movement of the original in a direction of movement by the moving device; and a single illuminating device which illuminates light onto a reading region of plural line sensors of the original reader and onto a reading region of the at least one line sensor, said original reading method comprising the steps of: subjecting the original to preliminary reading by the at least one line sensor in a state in which the original and the original reader are being moved relatively; on the basis of results of preliminary reading, positioning a region preliminarily read by the at least one line sensor at a reading region of the original reader; and in a state in which the region preliminarily read is positioned at the reading region of the original reader, stopping the original and the original reader relatively and subjecting the region preliminarily read to main reading by plural line sensors of the original reader.

The original reader relating to the first aspect of the present invention is formed by an arrangement of plural line sensors, and reads an original. The moving device moves the original and the original reader relatively in a direction in which the plural line sensors are arranged. The moving device may move only the original, may move only the original reader, or may move the original and the original reader relative to one another.

The control device controls the original reader and the moving device such that preliminary reading of the original is carried out by at least one line sensor among the plural line sensors in a state in which the original and the original reader are being moved relatively and main reading of the original is carried out by the plural line sensors in a state in which the original and the original reader are being intermittently moved relatively and the original and the original reader are stopped relatively.

In this way, preliminary reading is carried out by at least one line sensor among the plural line sensors of the original reader, and main reading of the original is carried out by the plural line sensors in a state in which the original and the original reader are being intermittently moved relatively and the original and the original reader are stopped relatively. Namely, because preliminary reading and main reading are not carried out by respectively different reading sections and are both carried out by the original reader, the structure can be simplified, and there is no need to consider the difference in speeds between preliminary reading and main reading. Because the invention of the twelfth aspect has the same operation and effects, description thereof will be omitted.

The focusing lens of the second aspect of the present invention focuses the original onto the original reader. The adjusting device adjusts the depth of field of the focusing lens. The adjusting device may adjust the depth of field by adjusting the diaphragm, or by moving the photographing lens and adjusting the focal point position. The planarizing device makes planar (flattens) a reading region of the original read by the original reader.

When the original is curved, the original is focussed by the focusing lens onto the original reader as a blurred image. It is not preferable for the original to be focused onto the original reader as a blurred image.

Thus, the controlling device controls the adjusting device and the planarizing device such that, during preliminary reading, the depth of field is made deep, and during main reading, the depth of field is made shallow and the reading region is made planar.

In this way, during preliminary reading, the depth of field is made deep, and during main reading, the depth of field is made shallow and the reading region is made to be planar. Thus, the original can be focussed onto the original reader at a sharpness which corresponds to the preliminary reading and the main reading, and the precision of reading the original can be improved.

The planarizing device may be, for example, a presser plate which presses the original and in which an opening corresponding to the reading region is formed. Or, the planarizing device may be a blower device which blows air toward the center of the original (toward the peak of the convex portion within the reading region).

The reason why, during preliminary reading, the depth of field is made deep, and during main reading, the depth of field is made shallow and the reading region is made planar is as follows. During preliminary reading, there is less of a need for highly precise reading of the original than there is during main reading. Thus, if the depth of field is made deep during preliminary reading, the blurring of the image can be kept within an allowable range, whereas during the main reading, the original must be read with high precision.

As in the third aspect of the invention, the image reading device may further comprise: a first planarizing device for making planar a reading region of the original read by at least one line sensor among the plural line sensors, and a second planarizing device for making planar an entire reading region of the original read by the original reader, and the control device may control the first planarizing device and the second planarizing device such that, during preliminary reading, the first planarizing device makes planar the reading region read by at least one line sensor among the plural line sensors, and during main reading, the second planarizing device, instead of the first planarizing device, makes planar the entire reading region read by the original reader.

In this way, during preliminary reading, planarization is carried out by the first planarizing device, and during main reading, planarization is carried out by the second planarizing device instead of the first planarizing device. Thus, the region corresponding to the preliminary reading and the main reading can be made planar, the original can be focused onto the original reader sharply, and the accuracy of reading the original can be improved.

The first planarizing device and the second planarizing device may be a blower device which blows air toward the center of the original (the peak of the convex portion within the reading region). Further, the first planarizing device may be a presser roller for pressing the original at a region other than a region necessary for image reading, and the second planarizing device may be a presser plate which presses the original and in which an opening corresponding to the reading region is formed.

As in the fourth aspect of the present invention, the original may be a photographic photosensitive material on which an image frame is formed, and at least one of a perforation and a bar code which specify the position of the image frame may be formed in the photographic photosensitive material.

In this case, the control device effects control such that, during preliminary reading, at least one line sensor among the plural line sensors reads the at least one of the perforation and the bar code, and during main reading, on the basis of the information of the read at least one of the perforation and the bar code, the image frame is positioned at a reading region read by the original reader.

In this way, because the at least one of the perforation and the bar code is read by at least one line sensor among the plural line sensors, there is no need to provide a special sensor or the like.

In the fifth aspect of the invention, the control device sets in advance at least one line sensor among the plural line sensors to be an exclusive-use line sensor, and during preliminary reading, the original is read by the exclusive-use line sensor.

In this case, as in the sixth aspect, the original reading device may further comprise a leading end detecting sensor which is positioned at a downstream side of the original in a direction of relative movement of the original at the time of preliminary reading, and which detects a leading end of the original. A line sensor, which is projected onto a plane of movement of the original at a position separated by a predetermined distance from a projection position of the leading end detecting sensor onto the plane of movement of the original, may be set to be the exclusive-use line sensor, and the control device may control the original reader such that preliminary reading starts from the time the original moves relatively for the predetermined distance from the time the leading end of the original is detected by the leading end detecting sensor.

In the above-described aspect, the original reader is structured by plural line sensors, preliminary reading is carried out by at least one line sensor of the plural line sensors, and main reading is carried out by the plural line sensors. However, in cases in which preliminary reading and main reading are carried out by an original reader and not at respectively different reading sections, the original reader does not necessarily have to be structured by plural line sensors.

Namely, as in the seventh aspect, the area sensor may be formed from plural reading elements. In this case, the moving device moves the original and the area sensor relatively in the predetermined direction of movement. The control device controls the area sensor and the moving device such that the original is subjected to preliminary reading by some of the reading elements of the area sensor in a state in which the original and the area sensor are being moved relatively, and the original is subjected to main reading by the area sensor in a state in which the original and the area sensor are stopped relatively while being intermittently moved relatively.

In this way, the area sensor is formed by plural reading elements. In a state in which the original and the area sensor are being moved relatively, some of the reading elements of the area sensor carry out preliminary reading. In a state in which the original and the area sensor are stopped relatively while being intermittently moved relatively, the original is subjected to main reading by the area sensor. Therefore, preliminary reading and main reading can be carried out by the area sensor without being carried out by respectively different reading sections. The structure can be made simple, and there is no need to consider the difference in speeds between preliminary reading and main reading. Because the invention of the thirteenth aspect has the same operation and effects, description thereof will be omitted.

In the eighth aspect of the present invention, the original reading device further comprises a first planarizing device for making planar a reading region of the original read by the some of the reading elements of the area sensor, and a second planarizing device for making planar an entire reading region of the original read by the area sensor. The control device controls the first planarizing device and the second planarizing device such that, during preliminary reading, the first planarizing device makes planar the reading region read by the some of the reading elements of the area sensor, and, during main reading, the second planarizing device, instead of the first planarizing device, makes planar the entire reading region read by the area sensor.

In the eighth aspect, in the same way as in the above-described third aspect, the region corresponding to the preliminary reading and the main reading can be made planar. Thus, the original can be focused onto the area sensor sharply, and the accuracy of reading the original can be improved.

As described above, the original may be a photographic photosensitive material on which an image frame is formed and at which at least one of a perforation and a bar code which specify the position of the image frame is formed, and the control device may effect control such that, during preliminary reading, the some of the reading elements of the area sensor also read the at least one of the perforation and the bar code, and during main reading, on the basis of information of the read at least one of the perforation and the bar code, the image frame is positioned at a reading region read by the area sensor.

Further, the control device may set in advance the some of the reading elements of the area sensor to be exclusive-use reading elements, and during preliminary reading, the original may be read by the exclusive-use reading elements.

The eleventh aspect of the present invention is an original reading device comprising: an original reader which is formed by an arrangement of plural line sensors and which reads an original; a moving device for moving the original and the original reader relatively in a direction in which the plural line sensors are arranged; at least one line sensor disposed at a position which is separated from the original reader at an upstream side of movement of the original in a direction of movement by the moving device; and a single illuminating device which illuminates light onto a reading region of plural line sensors of the original reader and onto a reading region of the at least one line sensor.

The single illuminating device illuminates light onto the reading region of the plural line sensors of the original reader and onto the reading region of the at least one line sensor. In this way, a single illuminating device suffices, and the overall structure can be made simple and compact The control device controls the original reader and the moving device such that preliminary reading of the original is carried out by the at least one line sensor in a state in which the original and the original reader are being moved relatively, and on the basis of results of preliminary reading, the region preliminarily read by the at least one line sensor is positioned at a reading region of the original reader, and in a state in which the region preliminarily read is positioned at the reading region of the original reader, the original and the original reader are stopped relatively and the region preliminarily read is subjected to main reading by plural line sensors of the original reader.

In this way, the original is subjected to preliminary reading by the at least one line sensor. On the basis of the results of the preliminary reading, the region which was preliminarily read by the at least one line sensor is stopped at the reading region of the original reader and is subjected to main reading by plural line sensors of the original reader. Thus, the original can be subjected to both preliminary reading and main reading without being moved reciprocally. The fourteenth aspect of the present invention has the same operation and effects, and therefore, description thereof will be omitted.

BRIEF DESCRIPTION OF THE DRAWINGS

FIG. 8 is a flowchart showing the main routine of the present embodiment.

FIG. 9 is a flowchart showing the prescanning routine of step 130 of FIG. 8.

FIG. 10 is a flowchart showing the fine scanning routine of step 132 in FIG. 8.

FIG. 13 is a view illustrating an example of an area CCD structured by plural CCDs.

FIG. 14 is a view illustrating another example of an area CCD structured by plural CCDs.

FIGS. 18A and 18B are views illustrating an example in which an image is relatively reduced and read during prescanning, and is relatively enlarged and read during fine scanning.

DESCRIPTION OF THE PREFERRED EMBODIMENTS

Embodiments of the present invention will be described in detail hereinafter with reference to the accompanying drawings. The description hereinafter utilizes numerical values which present no problems with regard to the present invention, but it is to be noted that the present invention is not limited to the numerical values used hereinafter.

Figure 1:
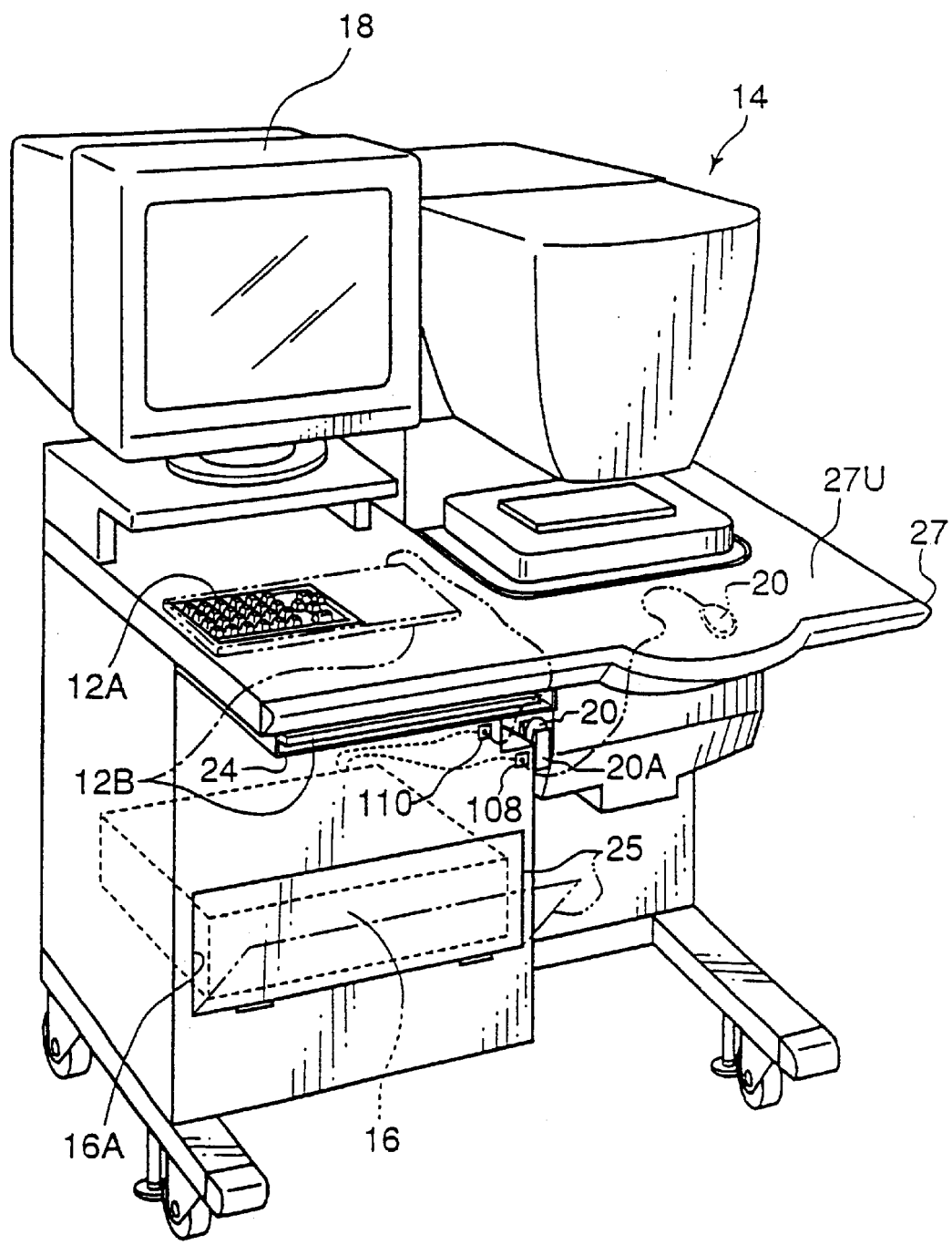
FIG. 1 is an external view of an area CCD scanner.

As illustrated in FIG. 1, an area CCD scanner (image reading device) 14 relating to the present embodiment is provided at a work table 27 at which are also provided an image processing section 16, a mouse 20, two keyboards 12A, 12B, and a display 18.

One of the keyboards 12A is embedded in a work surface 27U of the work table 27. The other keyboard 12B is stored in a drawer 24 of the work table 27 when not being used, and is removed from the drawer 24 and placed on top of the other keyboard 12A when used. At this time, the cord of the keyboard 12B is connected to a jack 110 connected to the image processing section 16.

The cord of the mouse 20 is connected to the image processing section 16 via a hole 108 formed in the work table 27. The mouse 20 is stored in a mouse holder 20A when not in use, and is removed from the mouse holder 20A and placed on the work surface 27U when used.

The image processing section 16 is accommodated in an accommodation portion 16A provided at the work table 27, and is closed therein by a door 25. When the door 25 is opened, the image processing section 16 can be removed from the accommodation portion 16A.

The area CCD scanner 14 reads a frame image recorded on a photographic photosensitive material such as a photographic film, e.g., a negative film, a reversal film, or the like. For example, the area CCD scanner 14 may read the film image of a 135 size photographic film, a 110 size photographic film, a photographic film on which a transparent magnetic layer is formed (a 240 size photographic film which is known as an APS film), and 120 size and 220 size (brownie size) photographic films. The area CCD scanner 14 reads, by an area CCD, the film image which is to be read, and outputs the image data.

The photographic film is a film in which, after a subject has been photographed, the film is subjected to developing processing such that a negative image or a positive image is made visible.

The image data outputted from the area CCD scanner 14 is inputted to the image processing section 16. The image processing section 16 carries out various types of image processings such as correction or the like on the inputted image data, and outputs the processed image data to a laser printer section (not shown) as image data for recording.

Figure 2:
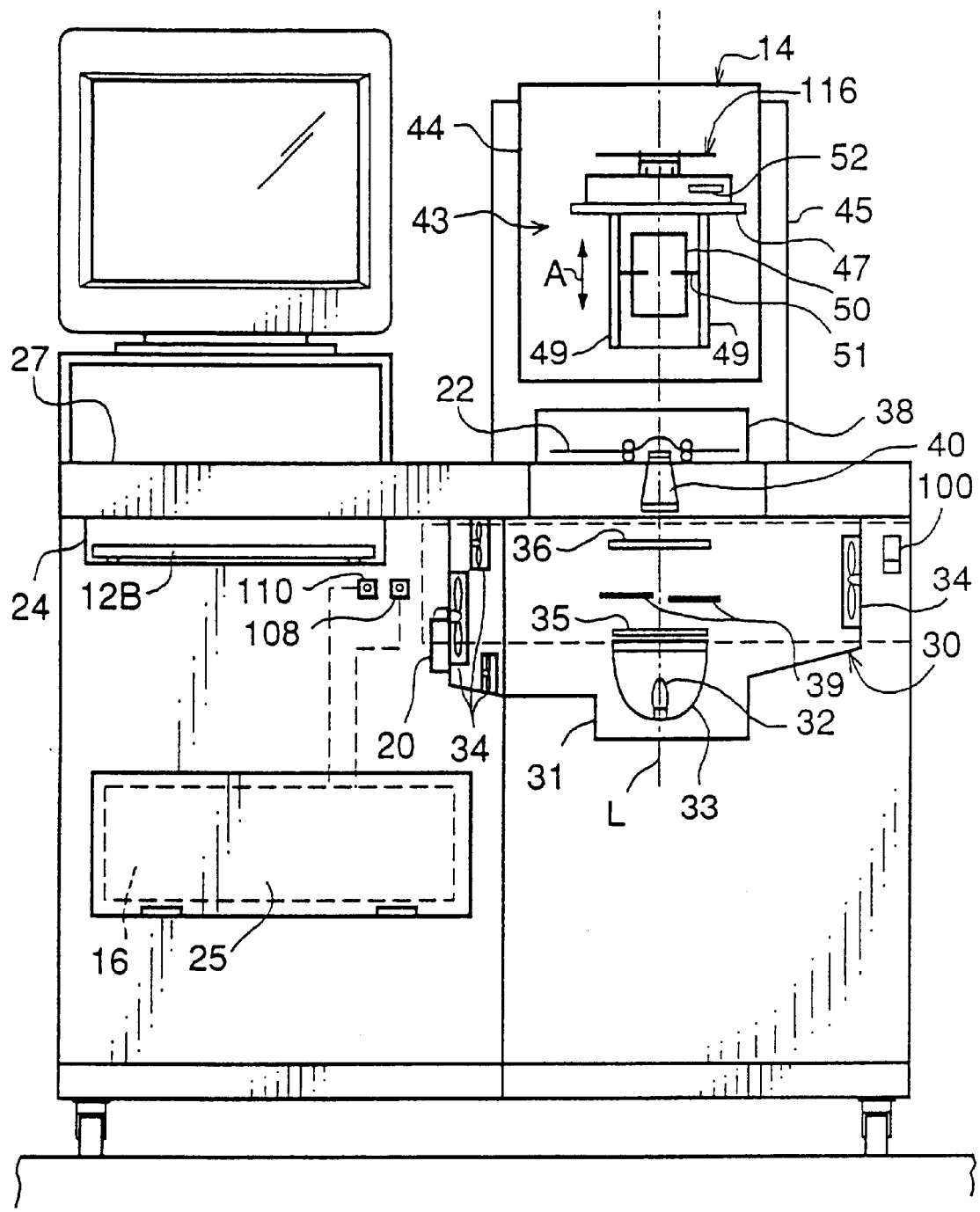
FIG. 2 is a front sectional view of an optical system of the area CCD scanner.
Figure 3:
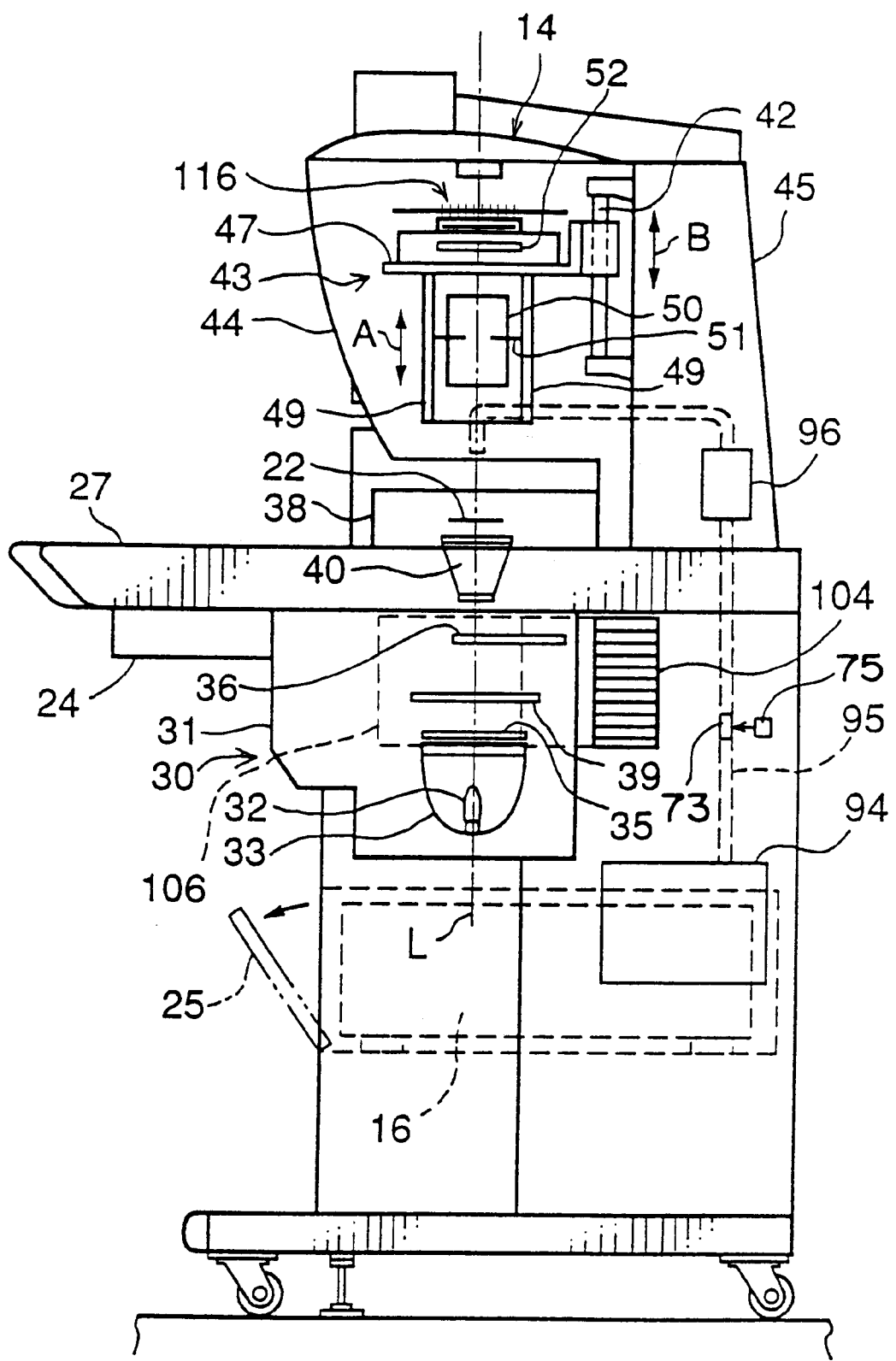
FIG. 3 is a side sectional view of the optical system of the area CCD scanner.

As illustrated in FIGS. 2 and 3, the optical system of the area CCD scanner 14 is provided with a light source section 30 which is disposed below the work table 27, a diffusion box 40 which is supported at the work table 27, a film carrier 38 which is set at the work table 27 and serves as a moving device, and a reading section 43 which is disposed at the side of the work table 27 opposite the side at which the light source section 30 is disposed.

The light source section 30 is housed in a metal casing 31. A lamp 32, which is a halogen lamp, a metal halide lamp, or the like, is disposed within the casing 31.

A reflector 33 is provided at the periphery of the lamp 32. A portion of the light emitted from the lamp 32 is reflected by the reflector 33, so as to be reflected off in a given direction. Plural fans 34 are provided at the sides of the reflector 33. The fans 34 are operated while the lamp 32 is lit, so as to prevent the interior of the casing 31 from overheating.

A UV/IR cutting filter 35, a diaphragm 39, and a turret 36 are disposed along the optical axis L of the light reflected from the reflector 33 in that order at the side of the reflector 33 from which light is reflected. By cutting light of wavelengths of ultraviolet and infrared regions, the UV/IR cutting filter 35 prevents chemical changing of the photographic film 22 and improves the reading accuracy by preventing an increase in temperature. The diaphragm 39 adjusts the amount of the light from the lamp 32 and the amount of light reflected by the reflector 33. A balance filter 36N for negative films and a balance filter 36P for reversal films are fit into the turret 36. These balance filters 36N, 36P appropriately set, in accordance with the type of photographic film (negative film/reversal film), the color components of the light which reaches the photographic film 22 and the reading section 43.

Figure 4A:
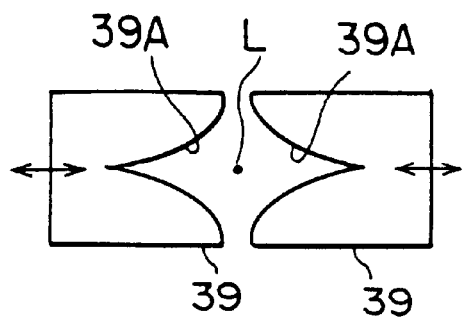
FIG. 4A is a plan view illustrating an example of a diaphragm.

The diaphragm 39 is formed from a pair of plate-like members (diaphragm plates) which are disposed so as to sandwich the optical axis L therebetween. The pair of plate-like members are slidable in directions of approaching and moving away from each other. As illustrated in FIG. 4A, a cut-out 39A is formed in one sliding-direction end of each of the pair of plate-like members of the diaphragm 39 such that the cross-sectional area, along the direction orthogonal to the sliding direction, varies continuously from the one sliding-direction end toward the other sliding-direction end. The ends of the plate-like members in which the cut-outs 39A are formed oppose each other.

In the above-described structure, in order to obtain light of the desired light components, the one of the filters (36N, 36P) corresponding to the type of the photographic film is positioned on the optical axis L, and the amount of light passing through the diaphragm 39 is adjusted by the position of the diaphragm 39 to the desired amount of light.

The diffusion box 40 is formed such that the length thereof along the conveying direction of the photographic film 22 conveyed by the film carrier 38 decreases toward the top portion of the diffusion box 40, i.e., decreases along the direction of approaching the photographic film 22 (see FIG. 2), and such that the length of the diffusion box 40 in the direction orthogonal to the conveying direction of the photographic film 22 (i.e., the length along the transverse direction of the photographic film 22) increases toward the top portion of the diffusion box 40, i.e., increases along the direction of approaching the photographic film 22 (see FIG.

3). Further, light diffusing plates (not shown) are mounted to both the light entering side and the light exiting side of the diffusion box 40. The abovedescribed diffusion box 40 is used for a 135 size photographic film. Other diffusion boxes (not shown) of configurations corresponding to other types of photographic films are also readied for use.

The light which enters the diffusion box 40 is directed toward the film carrier 38 (i.e., toward the photographic film 22), is made into slit light whose longitudinal direction is the transverse direction of the photographic film 22, is made into diffused light by the light diffusing plates, and exits from the diffusion box 40. In this way, by making the light which exits from the diffusion box 40 diffused light, there is less unevenness of the amount of light illuminated onto the photographic film 22, slit light of a uniform amount of light is illuminated onto the film image, and even if the film image is scratched, the scratches are difficult to notice.

A film carrier 38 and diffusion box 40 are readied for each type of photographic film 22, and are selected in accordance with the type of photographic film 22.

A long, thin hole (not shown), whose length along the transverse direction of the photographic film 22 is wider than the width of the photographic film 22, is provided in each of the top surface and the bottom surface of the film carrier 38 at positions corresponding to the optical axis L. The slit light from the diffusion box 40 is illuminated onto the photographic film 22 via the hole in the bottom surface of the film carrier 38. The light which has passed through the photographic film 22 passes through the hole in the top surface of the film carrier 38 and reaches the reading section 43.

The diffusion box 40 is supported such that the top surface thereof is near the reading position. Thus, a cut-out portion is provided in the bottom surface of the film carrier 38 so that the film carrier 38 and the diffusion box 40 do not interfere with each other when the film carrier 38 is loaded.

The film carrier 38 is formed so as to be able to convey the photographic film 22, when prescanning or fine scanning is carried out, at various different speeds in accordance with the density of the film image being fine scanned.

Figure 4B:
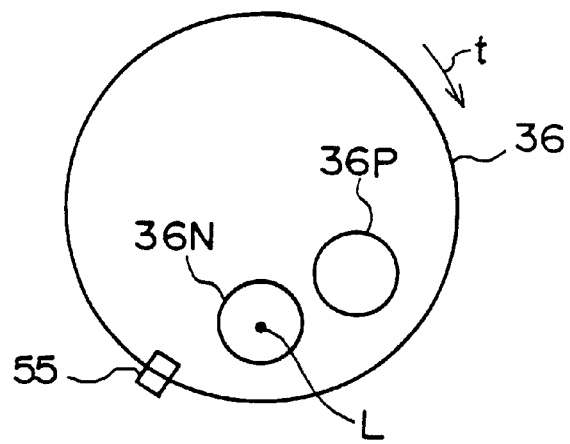
FIG. 4B is a plan view illustrating an example of a turret.
Figure 4C:
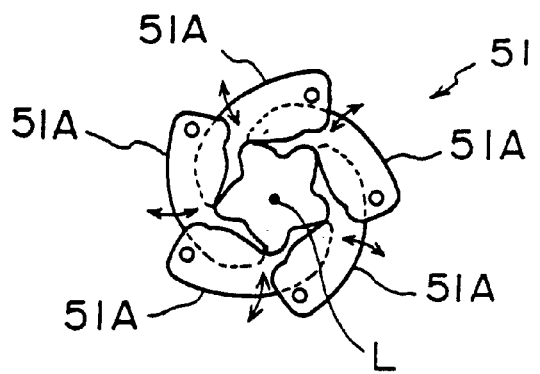
FIG. 4C is a plan view illustrating an example of a lens diaphragm.

The reading section 43 is accommodated within a casing 44. A loading stand 47, on whose top surface an area CCD 116 serving as an area sensor is mounted, is provided within the casing 44. Plural lens cylinders 49 hang downward from the loading stand 47. A lens unit 50 serving as a focusing lens is supported within the lens cylinder 49. The lens unit 50 is slidable in the directions of arrow A so as to approach and move away from the work table in order to adjust the magnification (e.g., reduction, enlargement). A support frame 45 is provided at the 27. The loading stand 47 is supported by guide rails 42 (see FIG. 3) which are mounted to the support frame 45, such that the loading stand 47 is slidable in directions of arrow B of approaching and moving away from the work table 27 in order to ensure the conjugate length when the magnification is changed or during autofocusing. The lens unit 50 is formed from plural lenses, and a lens diaphragm 51, which serves as an adjusting device, is provided between the plural lenses. As illustrated in FIG. 4C, the lens diaphragm 51 is provided with plural diaphragm plates 51A, each of which is formed in a substantially C-shaped configuration. The diaphragm plates 51A are disposed uniformly around the optical axis L, and one end portion of each diaphragm plate 51A is supported by a pin so as to be able to rotate about the pin. The plural diaphragm plates 51A are connected by an unillustrated link, and rotate in the same direction when driving force of a lens diaphragm driving motor (to be explained later) is transmitted thereto. In accordance with the rotation of the diaphragm plates 51A, the surface area of the portion which is no cut-off from light by the diaphragm plates 51A (the substantially star-shaped portion in FIG. 4C) varies around the optical axis L, such that the amount of light passing through the lens diaphragm 51 varies.

In the area CCD 116, sensing portions which are provided with a plurality of photoelectric converting elements such as CCD cells or photodiodes are provided in a line along the transverse direction of the photographic film 22, and electronic shutter mechanisms are provided in groups of three parallel lines spaced apart from one another. A color separating filter of R, G or B is mounted to the light-incident side of each sensing portion of each group. (Namely, each group is a so-called 3-line color CCD.) Further, plural transmitting portions are provided in vicinities of each of the sensing portions so as to correspond to the sensing portions. The charge accumulated in each CCD cell of the sensing portions is transmitted in order via the corresponding transmitting portion.

Figure 4D:
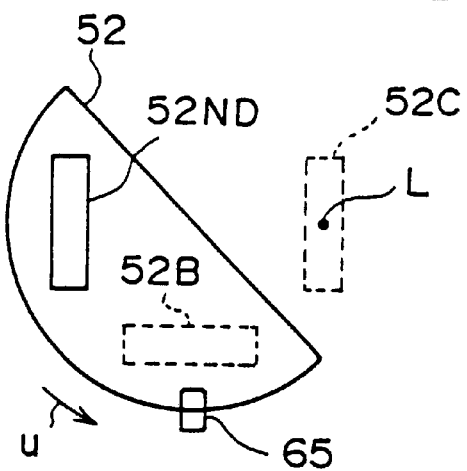
FIG. 4D is a plan view illustrating an example of a CCD shutter.

A CCD shutter 52 is provided at the light-incident side of the area CCD 116. As illustrated in FIG. 4D, an ND filter 52ND is fit into the CCD shutter 52. The CCD shutter 52 rotates in the direction of arrow u to switch to one of a completely closed state which is for darkness correction and in which the CCD shutter 52 blocks light which would otherwise be incident on the area CCD 116 (i.e., the state in which a portion such as 52B where the ND filter 52ND does not exist is positioned at a position 52C including the optical axis L), a completely open state (the position illustrated in FIG. 4D) which is for regular reading or for lightness correction and in which the CCD shutter 52 allows light to be incident onto the area CCD 116, and a light-reducing state (where the ND filter 52ND is positioned at the position 52C) which is for linearity correction and in which the light to be incident on the area CCD 116 is reduced by the ND filter 52ND.

As illustrated in FIG. 3, compressor 94, which generates cooling air to cool the photographic film 22 is provided at the work table 27. The cooling air generated by the compressor 94 is guided and supplied to an unillustrated reading portion of the film carrier 38 by a guide tube 95. In this way, the region of the photographic film 22 positioned at the reading portion can be cooled. Further, the guide tube 95 passes through a flow rate sensor 96 which detects the flow rate of the cooling air. Note that this sensor is not limited to a flow rate sensor, and a sensor which detects the wind speed of the cooling air or a pressure sensor which detects the pressure may be used.

Figure 5:
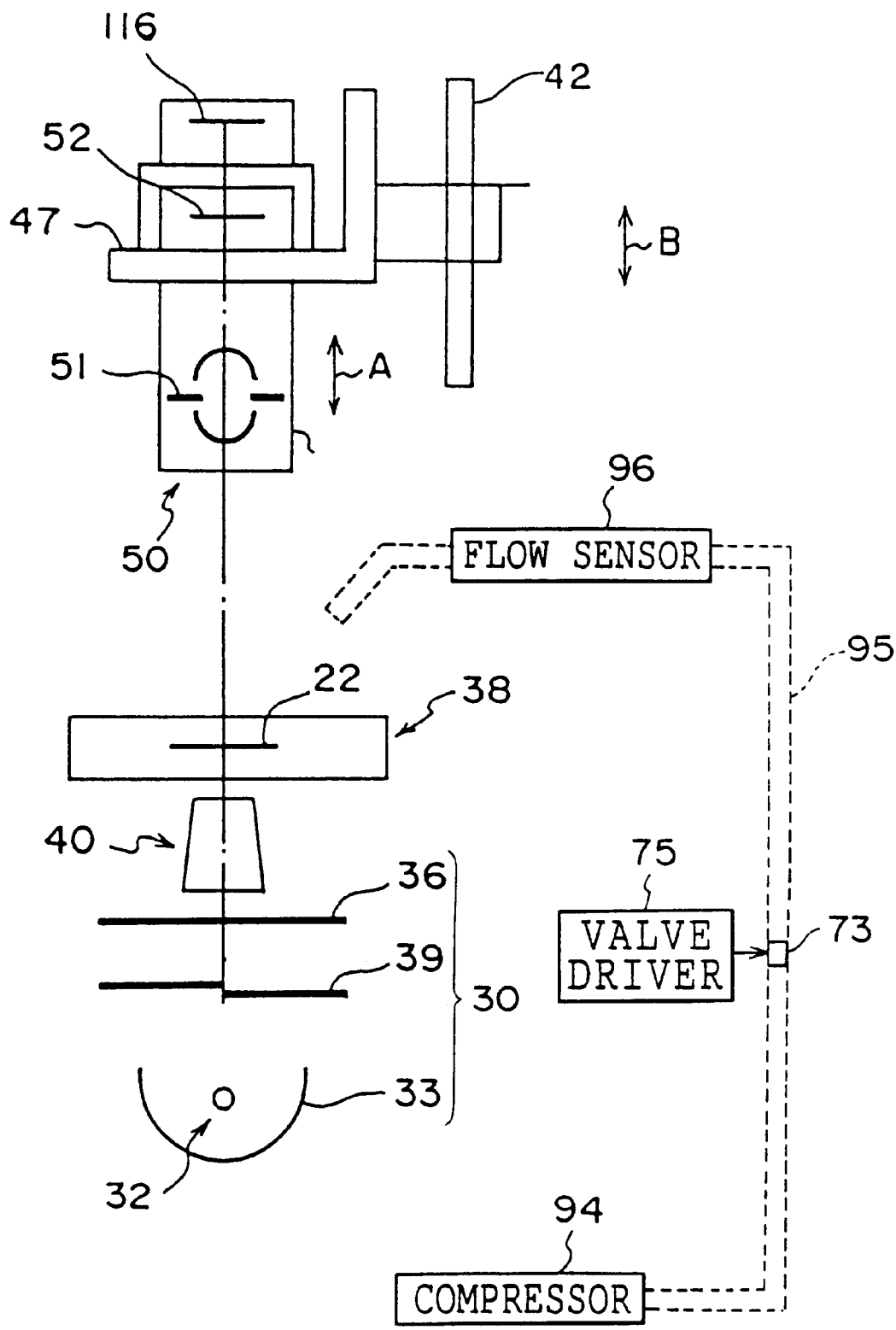
FIG. 5 is a diagram illustrating only the main portions of the optical system of the area CCD scanner.
Figure 6:
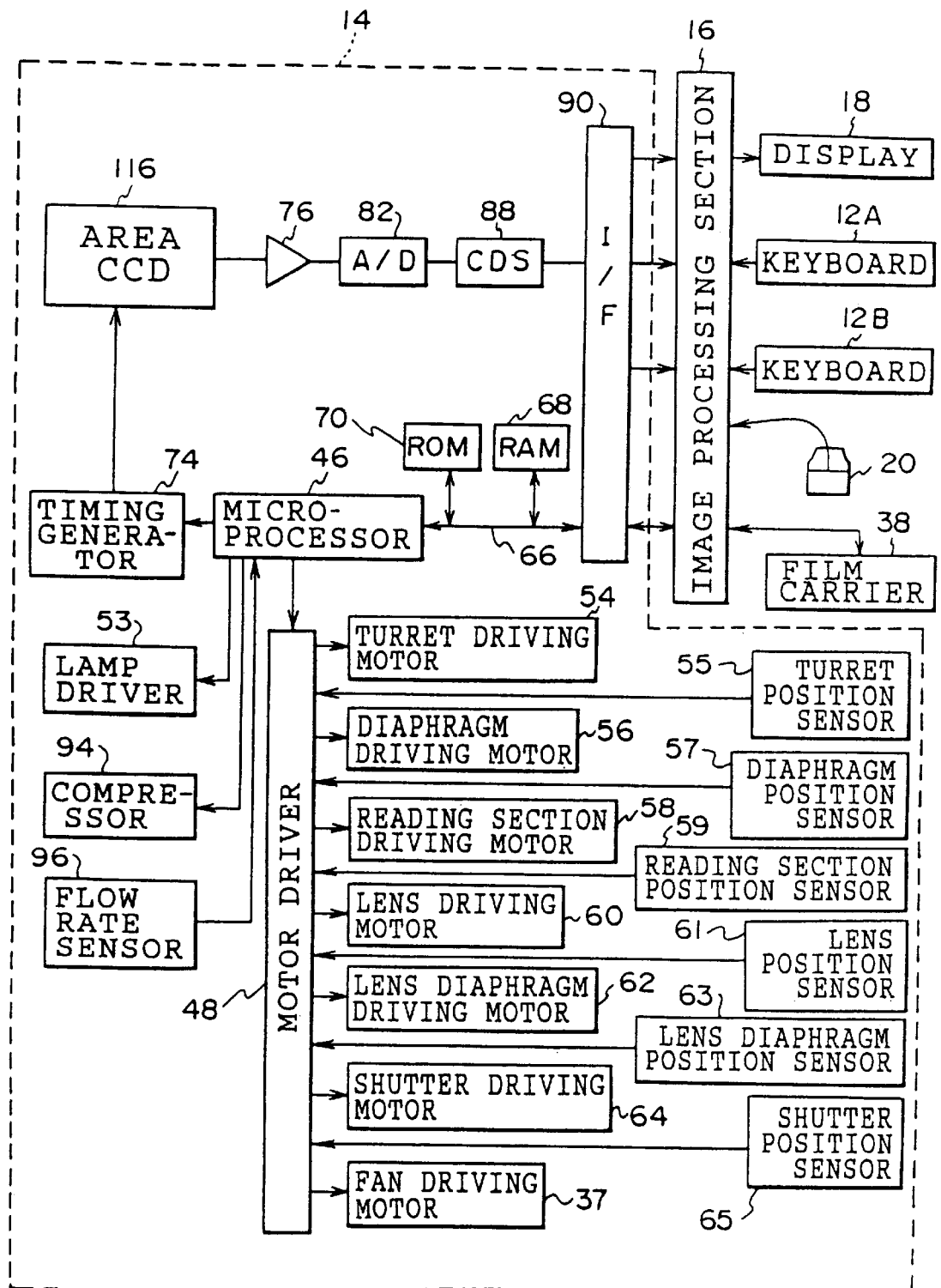
FIG. 6 is a block view illustrating the schematic structure of the electrical system of the area CCD scanner.

With reference to the main portions of the optical system of the area CCD scanner 14 illustrated in FIG. 5, the schematic structure of the electric system of the area CCD scanner 14 and the image processing section 16 will be described by using FIG. 6.

The area CCD scanner 14 has a microprocessor 46 which governs the overall control of the area CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the lamp 32 on and off in accordance with instructions from the microprocessor 46. When the film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 are connected to the motor driver 48. The turret driving motor 54 drives the turret 36 to rotate in the direction of arrow tin FIG. 4B such that one of the balance filter 36N for negative films or the balance filter 36P for reversal films of the turret 36 is positioned on the optical axis L. The turret position sensor 55 (see FIG. 4B) detects a reference position (an unillustrated cut-out) of the turret 36. Also connected to the motor driver 48 are a diaphragm driving motor 56 for sliding the diaphragm 39, a diaphragm position sensor 57 which detects the position of the diaphragm 39, a reading section driving motor 58 which slides the loading stand 47 (i.e., the area CCD 116 and the lens unit 50) along the guide rails 42, a reading section position sensor 59 for detecting the position of the loading stand 47, a lens driving motor 60 which slides the lens unit 50 along the lens cylinder 49, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (the position of the diaphragm plates 51A), a shutter driving motor 64 for switching the CCD shutter 52 between the completely closed state, the completely open state and the light reducing state, a shutter position sensor 65 for detecting the position of the shutter, and a fan driving motor 37 for driving the fan 34.

When prescanning (preliminary reading) and fine scanning (main reading) are carried out by the area CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

The microprocessor 46 determines the zoom magnification in accordance with the size of the film image, whether trimming is to be carried out, and the like. The microprocessor 46 slides the loading stand 47 by the reading section driving motor 58 on the basis of the position of the loading stand 47 detected by the reading section position sensor 59, so that the film image is read by the area CCD 116 at the determined zoom magnification. Further, the microprocessor 46 slides the lens unit 50 by the lens driving motor 60 on the basis of the position of the lens unit 50 detected by the lens position sensor 61.

When focusing control, to make the light-receiving surface of the area CCD 116 coincide with the film image focusing position by the lens unit 50, is carried out (i.e., when autofocusing control is carried out), the microprocessor 46 slides only the loading stand 47 by the reading section driving motor 58. This focusing control can be carried out by, for example, making the contrast of the film image read by the area CCD 116 a maximum (what is know as the image contrast method). Alternatively, a distance between the photographic film 22 and the lens unit 50 (or the are CCD 116) may be provided, and focusing control can be carried out on the basis of the distance detected by the distance sensor instead of on the basis of the data of the film image.

A timing generator 74 is connected to the area CCD 116. The timing generator 74 generates various types of timing signals (clock signals) for operating the area CCD 116, an A/D converter 82 which will be described later, and the like. The signal output terminal of the area CCD 116 is connected to the A/D converter 82 by an amplifier 76. The signal outputted from the area CCD 116 is amplified by the amplifier 76 and is converted into digital data at the A/D converter 82.

The output terminal of the A/D converter 82 is connected to the image processing section 16 via a correlation double sampling circuit (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The CDS 88 successively outputs the results of calculation (pixel data which accurately corresponds to the amount of accumulated charge in each CCD cell) to the image processing section 16 via the I/F circuit 90 as scan image data.

The display 18, the keyboards 12A, 12B, the mouse 20 and the film carrier 38 are connected to the image processing section 16.

Figure 7A:
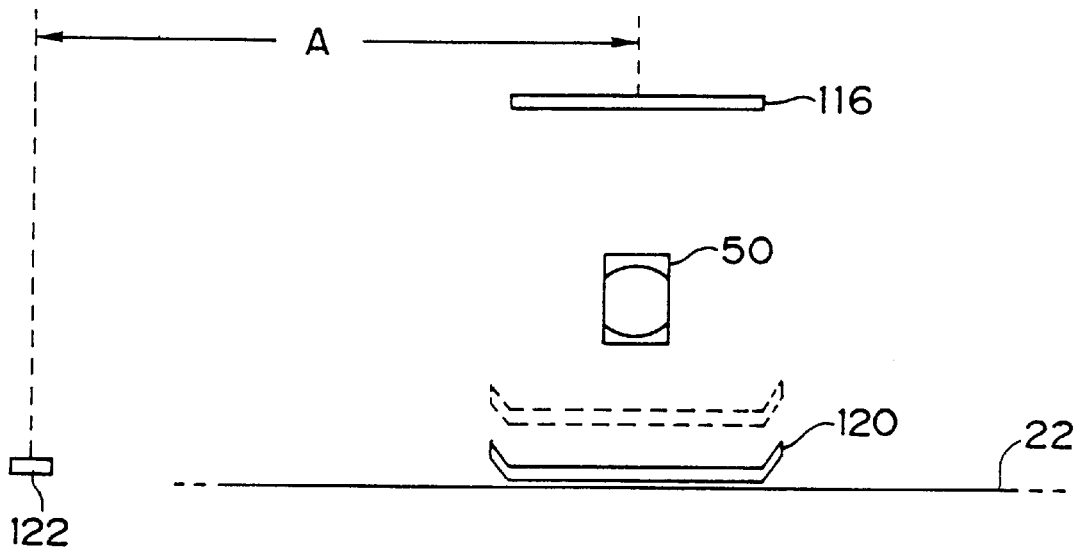
FIG. 7A is a cross-sectional view illustrating positions of a leading end detecting sensor, a presser plate and an exclusive-use line sensor.
Figure 7B:
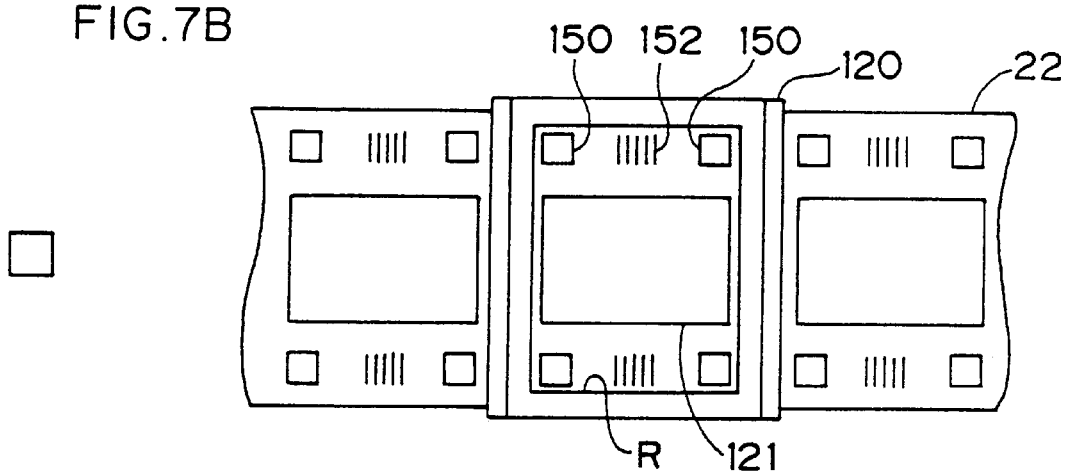
FIG. 7B is a top view thereof.

A presser plate 120 is provided in the film carrier 38. As illustrated in FIGS. 7A and 7B, the presser plate 120 moves to a position of the reading region of the photographic film 22 read by the area CCD 116 and a position which is separated from the reading region toward the area CCD side. An opening R corresponding to the reading region is formed in the presser plate 120. When the presser plate 120 is pressed to the position of the reading region at which the photographic film 22 is read by the area CCD 116, the planarity of the photographic film 22 is ensured. Plural image frames 121 are formed on the photographic film 22. Perforations 150 and bar codes 152 which designate the positions of the respective image frames 121 are formed at the photographic film 22 in correspondence with the image frames 121. The perforations 150 designate the specific positions of the image frames 121. The bar codes 152 of any given image frame 121 designate which position, from the image frame located at the end of the photographic film, the given image frame is located at. As shown in FIG. 7B, the size of the opening R is such that, when the image frame 121 is positioned at the reading region, the image frame 121, the perforations 150 and the bar codes 152 all fall within the opening R. Thus, the respective line sensors of the area CCD 116 can read the perforations 150 and the bar codes 152 in addition to the image frame 121.

A leading end detecting sensor 122, which detects the leading end of the photographic film 22, is provided within the film carrier 38 at the upstream side in the moving direction of the photographic film 22 at the time of prescanning (i.e., is provided ahead of the reading region). The line sensor, which is projected onto the plane of movement of the photographic film 22 at a position separated by a predetermined distance A from the projection position of the leading end detecting sensor 122 onto the plane of movement of the photographic film 22, is set in advance to be the exclusive-use line sensor.

FIG. 8 shows the main routine of the area CCD scanner 14 relating to the present embodiment. The main routine begins when the photographic film 22 is loaded at the film carrier 38 and a start key (not shown) is turned on. In step 120, prescanning is carried out, and in step 132, fine scanning is carried out.

Next, with reference to FIG. 9, prescanning (step 130) will be described in detail. During prescanning, as illustrated in FIG. 7A, the presser plate 120 is positioned at a position (refer to the dotted line) separated toward the area CCD from the position of the reading region of reading the photographic film 22 by the area CCD 116. In step 134 in FIG. 9, the lens diaphragm driving motor 62 is controlled such that the opening of the lens unit 50 is decreased by the diaphragm 51 so that the depth of field is made deep. Namely, there are cases in which the photographic film 22 is curved. When the photographic film 22 is curved, the photographic film 22 includes a position which is near the area CCD 116 and a position which is far from the area CCD 116. In this step 134, the lens diaphragm driving motor 62 is controlled such that the opening of the lens unit 50 is decreased by the diaphragm 51 such that a position (an estimated position) of the photographic film 22 near the area CCD 116 becomes the near point of accommodation, and a position (an estimated position) of the photographic film 22 far from the area CCD 116 becomes the far point of accommodation. In step 136, the conveying of the photographic film 22 begins.

In step 138, a determination is made as to whether the leading end of the photographic film 22 has been detected by the leading end detecting sensor 122. If the leading end of the photographic film 22 has been detected by the leading end detecting sensor 122, as described above, the leading end of the photographic film 22 is positioned at a position which is separated, at the photographic film conveying direction upstream side, by a distance A from the exclusive-use line sensor.

In step 140, a determination is made as to whether the photographic film 22 has moved distance A, by determining, from the conveying speed and from the distance A, whether the time required for the photographic film 22 to move distance A has elapsed. Namely, a determination is made as to whether the leading end of the photographic film 22 has reached the reading region of the exclusive-use line sensor.

When the leading end of the photographic film 22 has reached the reading region of the exclusive-use line sensor, in step 142, reading of the photographic film 22 by the exclusive-use line begins. At this time, not only the image frame 121 formed on the photographic film 22, but also the perforations 150 and the bar codes 152 are read. In this way, the position of that particular image frame 121 can be specified.

In step 144, by determining whether the amount of light received by the exclusive-use line sensor is excessively great, a determination is made as to whether the trailing end of the photographic film 22 has been detected. If the trailing end of the photographic film 22 has been detected, the reading of the photographic film 22 is completed, and therefore, in step 146, the conveying and the reading of the photographic film are stopped.

Next, with reference to FIG. 10, fine scanning (step 132) will be described in detail. In step 148 of FIG. 10, the lens diaphragm driving motor 62 is controlled such that the opening of the lens unit 50 is decreased by the diaphragm 51 so that the depth of field becomes shallow.

The number of image frames formed on the photographic film 22 can be known from the above-described prescan. Therefore, in step 150, a variable G for identifying the respective image frames in order is initialized, and in step 152, the variable G is incremented by 1. In step 154, the photographic film 22 begins to be conveyed in the direction opposite to the direction of conveying at the time of prescanning. On the basis of the information of the perforations 150 and the bar codes 152, a determination is made as to whether an image frame G, which is identified by the variable G, is positioned (see FIG. 7B) within the reading region of the area CCD 116.

When the image frame G is positioned within the reading region of the area CCD 116, in step 158, conveying of the photographic film 22 is stopped. In step 160, as illustrated in FIG. 7A, the presser plate 120 is pressed against the photographic film 22. In this way, the planarity of the reading region can be ensured. Because the planarity is ensured, in step 162, the photographic film 22 is read by the entire area CCD. When reading of the original by the entire area CCD is finished, the presser plate 120 is withdrawn (refer to the position illustrated by the dotted line in FIG. 7A).

A determination is made as to whether the variable G is the total number G0 of image frames formed on the photographic film. If the variable G is not the total number G0 of image frames, there are still image frames which have not yet been fine-scanned, and thus, the routine returns to step 152, and the above processings (steps 152 through 164) are carried out. On the other hand, if the variable G is the total number G0 of image frames, fine scanning of all of the image frames is completed, and this routine ends.

As described above, in the present embodiment, prescanning is carried out by one line sensor of the area sensor, and fine scanning is carried out by plural line sensors. Thus, both preliminary reading and main reading can be carried out by the area sensor. The structure can be simplified, and there is no need to consider the difference in speeds between the preliminary reading and the main reading.

In the present embodiment, the depth of field is made deep at the time of preliminary reading. At the time of main reading, the depth of field is made shallow and the reading region is made planar. Therefore, the original can be focussed onto the area sensor at a sharpness corresponding to the preliminary reading and the main reading, and the precision of reading the original can be improved.

Further, in the present embodiment, at least one of perforations and bar codes are read by the exclusive-use line sensor. Thus, there is no need to provide a special sensor or the like.

Figure 11A:
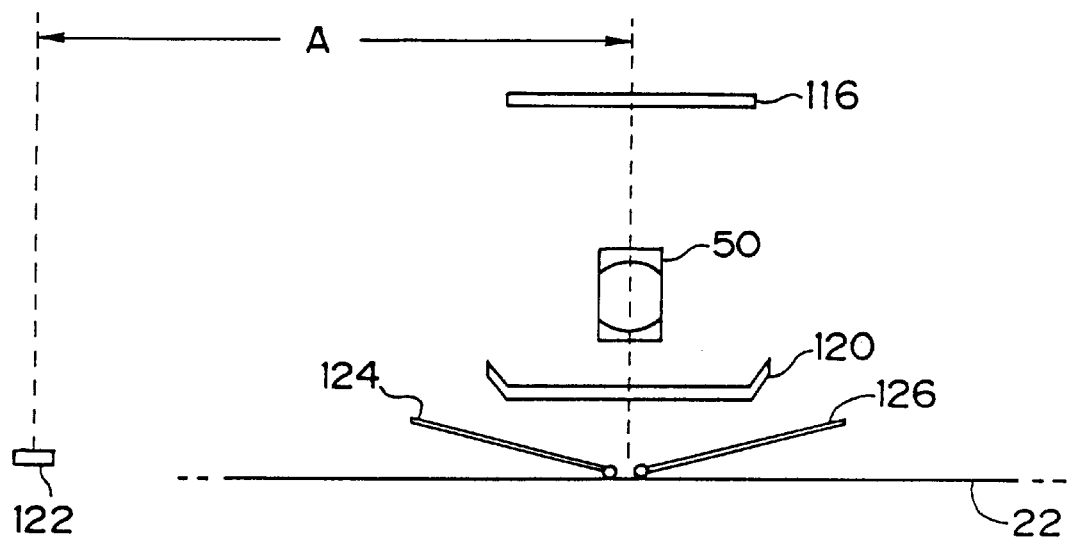
FIG. 11A is a view illustrating positions of a leading end detecting sensor, presser rollers, a presser plate and an exclusive-use line sensor relating to a variant example, at the time of prescanning.
Figure 11B:
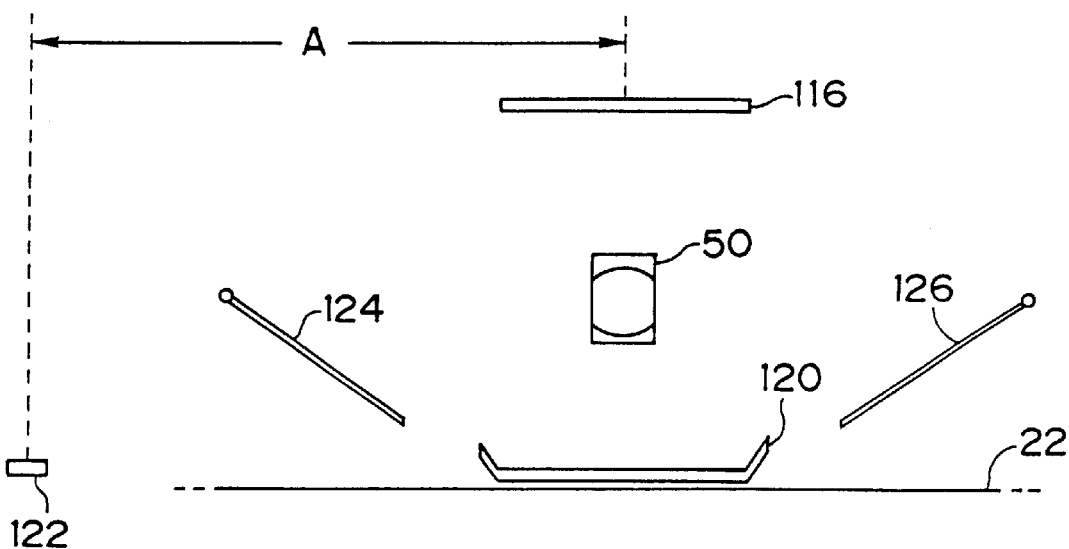
FIG. 11B is a view illustrating positions of the leading end detecting sensor, the presser rollers, the presser plate and the exclusive-use line sensor relating to the variant example, at the time of fine scanning.
Figure 12A:
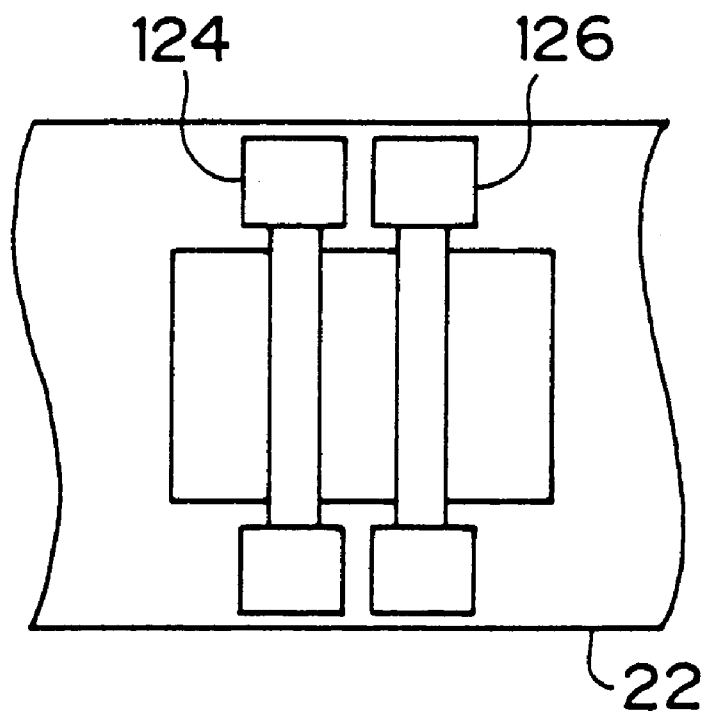
FIGS. 12A and 12B are views illustrating the presser rollers.
Figure 12B:
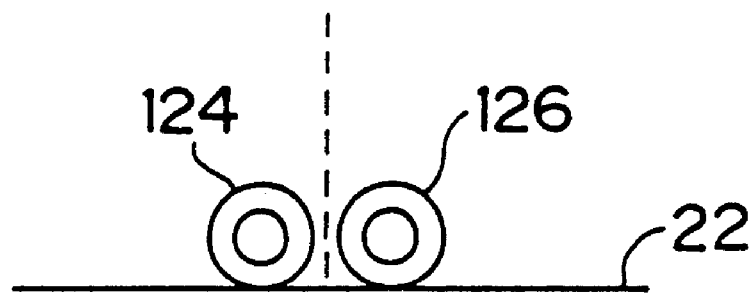

In the above-described embodiment, at the time of prescanning, the depth of field is made deep, and at the time of fine scanning, the depth of field is made shallow and the presser plate is pressed. However, the present invention is not limited to the same. As illustrated in FIGS. 11A, 11B, 12A and 12B, in addition to the presser plate 120, a pair of presser rollers 124, 126, which make planar the reading region of the exclusive-use line, may be provided, and the depth of field may be maintained shallow as it is. During prescanning, as shown in FIG. 11A and FIGS. 12A and 12B, the reading region of the exclusive-use line may be made planar by the pair of presser rollers 120, 124, and during fine scanning, the photographic film 22 may be pressed by the presser plate 120 instead of by the pair of presser rollers 124, 126.

Further, in the above embodiment, the depth of field is adjusted by the lens diaphragm, but the present invention is not limited to the same. The depth of field may be adjusted by moving the lens unit by the reading portion driving motor, such that the focal point position is located at a position slightly toward the area CCD side from the photographic film surface (i.e., such that the position of the photographic film close to the area CCD is the near point of accommodation, and the position of the photographic film far from the area CCD is the far point of accommodation).

The presser plate and presser rollers are used in the present embodiment, but the present invention is not limited to the same, and a blower device for blowing air toward the center of the photographic film may be employed.

Further, in the present embodiment, the exclusive-use line sensor is a line sensor which is located a predetermined distance away from the leading end detecting sensor. However, the present invention is not limited to the same, and any arbitrary line sensor of the area CCD sensor may be used as the exclusive-use line sensor. Moreover, a single line sensor is used as the exclusive-use line sensor, but the present invention is not limited to the same, and plural line sensors may be used. In this case, for example, three line sensors may be used, and may be three line color sensors which read lights of respectively different reading wavelength regions (R light, G light, B light).

In addition, in the present embodiment, although prescanning is carried out while the photographic film is being conveyed in one direction and fine scanning is carried out while the photographic film is being conveyed in the opposite direction, the present invention is not limited to the same. Each time an image frame is detected by prescanning, fine scanning of that image frame may be carried out.

In the above-described embodiment, the area sensor is structured by plural line sensors, preliminary reading is carried out by at least one line sensor of the plural line sensors, and main reading is carried out by the plural line sensors. However, in cases in which preliminary reading and main reading are carried out by an area sensor and not at respectively different reading sections, the area sensor does not necessarily have to be formed by plural line sensors.

Namely, as shown in FIG. 13, the area sensor may be structured by an arrangement of plural CCDs. Then, with a direction orthogonal to the conveying direction of the photographic film 22 being the main scanning direction and with the conveying direction being the subscanning direction, preliminary reading can be carried out by predetermined CCDs in accordance with each pixel line in the main scanning direction, and main reading can be carried out by all of the CCDs. In this case, preliminary reading is carried out with the reading start time determined in accordance with the positions of the predetermined CCDs.

As shown in FIG. 13, when CCDs for preliminary reading are determined randomly in accordance with each pixel line in the main scanning direction, control of the reading start time of each CCD becomes complicated. Therefore, as shown in FIG. 14, preliminary reading may be carried out by CCDs at diagonally adjacent positions along the main scanning direction.

In the above-described embodiment, during prescanning, the photographic film is conveyed from one end thereof to the other end, and during fine scanning, the photographic film is conveyed from the other end to the one end. However, the present invention is not limited to the same, and fine scanning and prescanning may be carried out while the photographic film is being conveyed from one end to the other end.

Figures 15A, 15B:
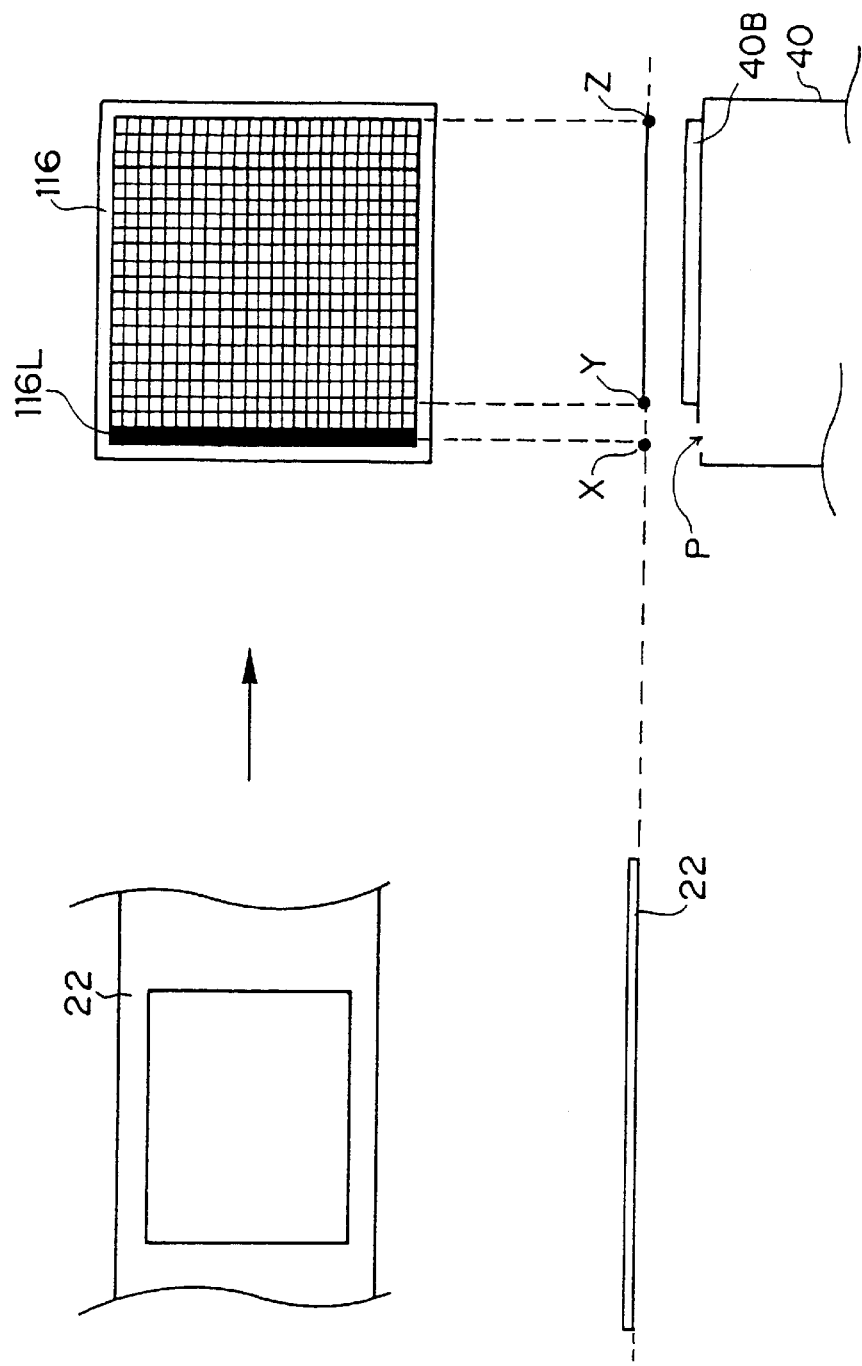
FIGS. 15A and 15B are views illustrating a structure in which fine scanning and prescanning are carried out while a photographic film is being conveyed from one end thereof to the other.
Figure 16:
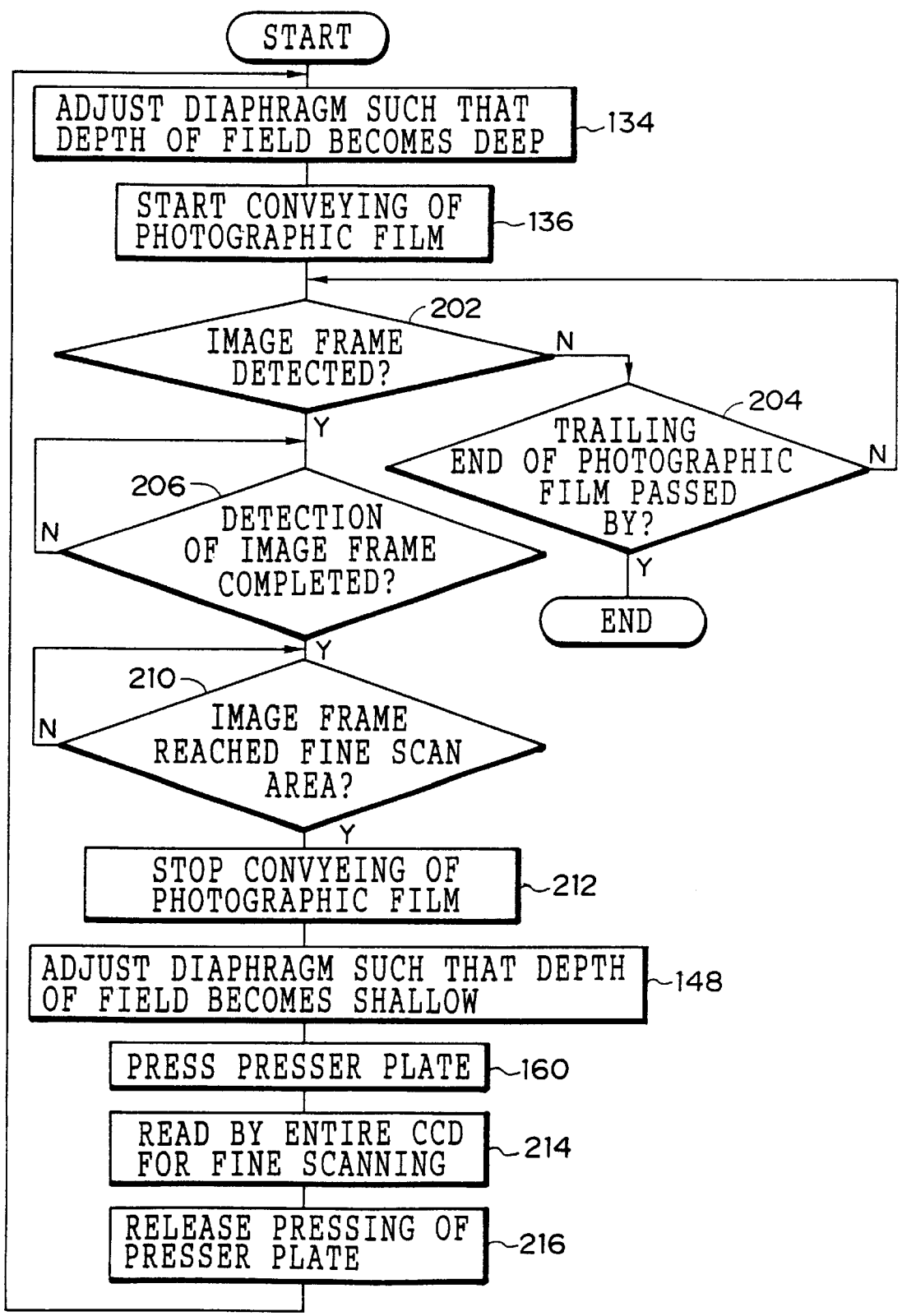
FIG. 16 is a flowchart showing operation for carrying out fine scanning and prescanning while the photographic film is being conveyed from one end thereof to the other in accordance with the structure illustrated in FIGS. 15A and 15B.

More specifically, as illustrated in FIGS. 15A and 15B, (at least one) line sensor 116L which is positioned at a photographic film conveying direction upstream side within the area CCD 116 may be set to be the exclusive-use line sensor for prescanning, and the line sensors which are in an area at which the image frame is readable at the line sensors other than the line sensor 116L may be set to be the CCDs for fine scanning, and control may be carried out as shown in FIG. 16. Further, as shown in FIG. 15B, the diffusion box 40 has an opening P such that light can be condensed at the reading region of the line sensor 116L, and has a diffusion plate (not shown) such that light can be diffused at the reading region of the CCDs for fine scanning. The light reflecting surface of the diffusion plate is freely rotatable. As will be described later, the light reflecting surface of the diffusion plate may be controlled such that, during prescanning, light is condensed at the reading region of the line sensor 116L, and during fine scanning, light is diffused at the reading region of the CCDs for fine scanning. In FIG. 16, portions denoting the same operation as in the previously-described embodiment are denoted by the same reference numerals, and description thereof is omitted.

In step 134 of FIG. 16, the diaphragm is adjusted such that the depth of field becomes deep. In subsequent step 136, conveying of the photographic film 22 is started. In step 202, by using the line sensor 116L, on the basis of a change in output of the line sensor 116L (from strong to weak), a determination is made as to whether an image frame has been detected. If an image frame has not been detected, in step 204, on the basis of a change in output of the line sensor 116L (from strong to stronger), a determination is made as to whether the trailing end of the photographic film has passed the line sensor 116L. If the trailing end of the photographic film has passed the line sensor 116L, processing of all of the image frames is completed, and the present routine ends.

On the other hand, if it is determined in step 202 that an image frame has been detected, in step 206, on the basis of a change in output of the line sensor 116L (from weak to strong), a determination is made as to whether detection of an image frame has been completed. If detection of an image frame has been completed, the size of the image frame can be ascertained on the basis of the time from the detection of the image frame to the end of this detection. Therefore, in step 210, on the basis of the size of the image, a determination is made as to whether the image frame has reached the fine scan area (the reading region of the CCDs for fine scanning). If the image frame has reached the fine scan area, in step 212, the conveying of the photographic film 22 is stopped, and in step 148, the diaphragm is adjusted such that the depth of field becomes shallow. In step 160, the presser plate 120 is pressed, and in step 214, main reading of the image frame is carried out at the CCDs for fine scanning (the line sensor 116L is not used). In step 216, the pressing of the presser plate is released, and the routine returns to step 134.

Figures 17A, 17B:
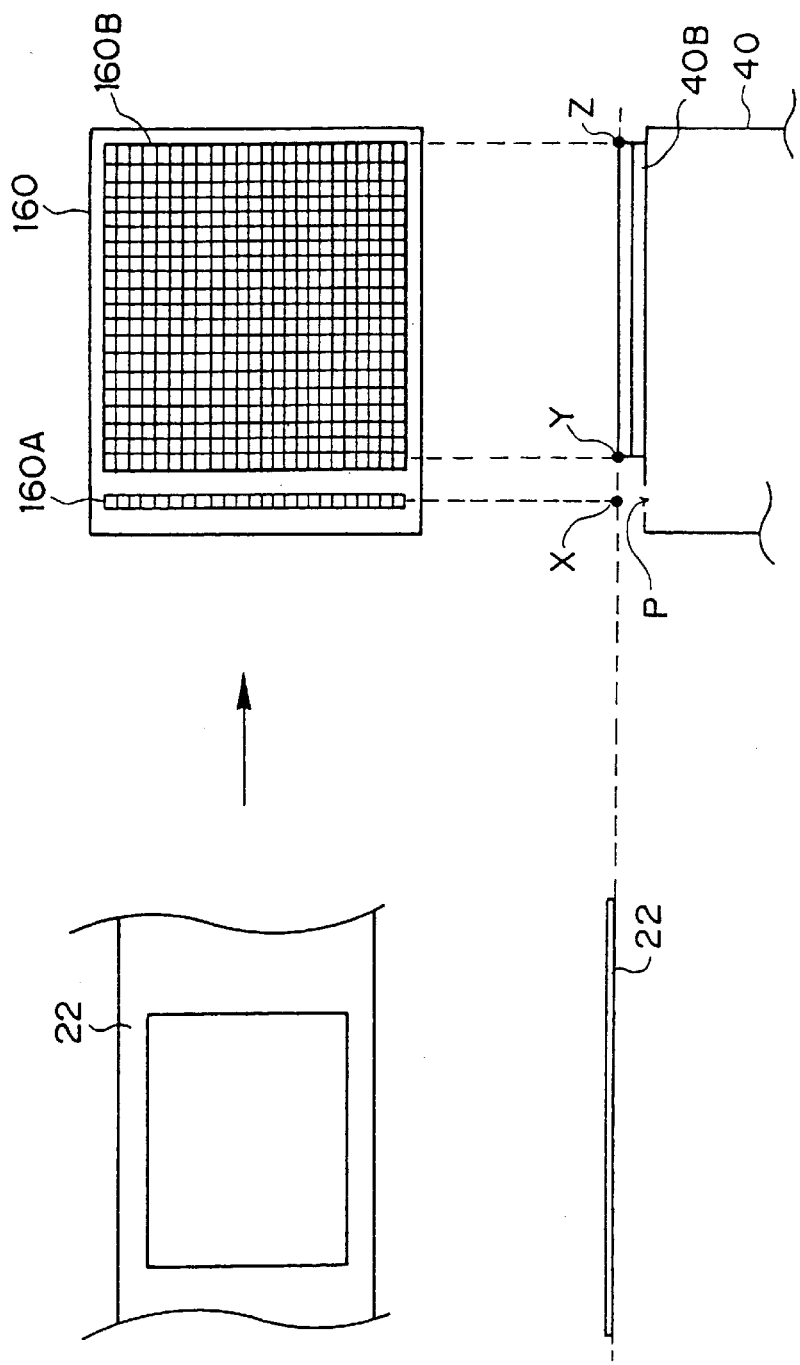
FIGS. 17A and 17B are views illustrating another structure in which fine scanning and prescanning are carried out while a photographic film is being conveyed from one end thereof to the other.

In the example illustrated in FIGS. 15A and 15B, a line sensor 116L which is positioned at a photographic film conveying direction upstream side within the area CCD 116 is set to be the exclusive-use line sensor for prescanning, and the line sensors which are in an area at which the image frame is readable at the line sensors other than the line sensor 116L are set to be the CCDs for fine scanning. However, the present invention is not limited to the same. As illustrated in FIGS. 17A and 17B, the area CCD 116 may be structured by an area CCD 160B for fine scanning which if formed by line sensors in the area at which the image frame can be read, and a line sensor 160A which is disposed independently of and at the photographic film conveying direction upstream side of the CDs 160B for fine scanning and which is set to be the (at least one) exclusive-use line sensor for prescanning.

Further, as illustrated in FIG. 18A, it is possible to carry out prescanning in the following manner. The image frame is reduced at a magnification n=n1 and focused onto the area CCD 116. The image frame is prescanned as described above by the CCDs of a portion of at least one line sensor within the area CCD 116. Fine scanning may be carried out in the following manner as shown in FIG. 18B. The image frame is enlarged relatively as compared to during prescanning (i.e., is enlarged at a magnification of n=n2 (>n1)), is focused onto the area CCD 116, and is fine scanned by the area CCD 116 as described above.

The above-described line sensor is a group of: a line sensor at which an R filter is provided, a line sensor at which a G filter is provided, and a line sensor at which a B filter is provided.

Although an example of a case in which a CCD is used as the area CCD is described in the above embodiment, the present invention is not limited to the same, and another fixed pick-up device such as a MOS pick-up sensor or the like may be used.

The original is moved with respect to the area CCD in the above-described embodiment, but the present invention is not limited to the same. The area CCD may be moved with respect to the original, or the original and the area CCD may be moved relative to one another.

In the above description, a film image recorded on a photographic film is used as the original to be read, and the film image is read by light transmitted through the film image. However, the present invention is not limited to the same, and the original in the present invention may be a transmission original other than a film image recorded on a photographic film, or, the present invention may be applied to a film reading device such as, for example, a tele-cine converter. Further, a reflection original, such as an image recorded on a medium having low or no light transmittance (e.g., regular paper) may be used. In this case, the original reading device relating to the present invention may be structured to read the light which is emitted from the light source and reflected off of the original. The present invention is also applicable to original reading devices such as color copiers, facsimile devices, and the like.

As described above, in the first aspect of the present invention, preliminary reading is carried out by at least one line sensor of an area sensor, and main reading is carried out by plural line sensors. Thus, excellent effects are achieved in that both preliminary reading and main reading can be carried out by the area sensor, the structure can be made simple, and there is no need to consider the difference in speeds between the preliminary reading and the main reading.

In the second aspect of the present invention, when preliminary reading is carried out, the depth of field is made deep, and when main reading is carried out, the depth of field is made shallow and the reading region is made planar. Therefore, excellent effects are achieved in that the original can be focused onto the area sensor at a sharpness which corresponds to the preliminary reading and the main reading, and the accuracy of reading the original can be improved.

In a third aspect of the present invention, during preliminary reading, planarization is carried out by a first planarizing device, and during main reading, planarization is carried out by a second planarizing device rather than the first planarizing device. Thus, excellent effects are achieved in that the regions corresponding to the preliminary reading and the main reading can be made planar, the original can be focussed clearly on the area sensor, and the accuracy of reading the original can be improved.

In a fourth aspect of the present invention, at least one of perforations and bar codes are read by at least one line sensor among plural line sensors. Thus, an excellent effect is achieved in that there is no need to provide a special sensor or the like.

What is claimed is:

1. An original reading device comprising:
   an original reader which is formed by an arrangement of plural line sensors and which reads an original;
   a moving device for moving the original and the original reader relatively in a direction in which the plural line sensors are arranged; and
   a control device for controlling the original reader and the moving device such that, preliminary reading of the original is carried out by at least one line sensor among the plural line sensors in a state in which the original and the original reader are being moved relatively, and main reading of the original is carried out by the plural line sensors in a state in which the original and the original reader are stopped relatively.

2. An original reading device according to claim 1, further comprising:
   a focusing lens for focusing the original onto the original reader;
   an adjusting device for adjusting a depth of field of the focusing lens; and
   a planarizing device for making planar a reading region of the original read by the original reader,
   wherein the controlling device controls the adjusting device and the planarizing device such that, during preliminary reading, the depth of field is made deep, and during main reading, the depth of field is made shallow and the reading region is made planar.

3. An original reading device according to claim 1, further comprising:
   a first planarizing device for making planar a reading region of the original read by at least one line sensor among the plural line sensors; and
   a second planarizing device for making planar an entire reading region of the original read by the original reader,
   wherein the control device controls the first planarizing device and the second planarizing device such that, during preliminary reading, the first planarizing device makes planar the reading region read by at least one line sensor among the plural line sensors, and during main reading, the second planarizing device, instead of the first planarizing device, makes planar the entire reading region read by the original reader.

4. An original reading device according to claim 1, wherein the original is a photographic photosensitive material on which an image frame is formed and at which at least one of a perforation and a bar code which specify the position of the image frame is formed, and
   the control device effects control such that, during preliminary reading, at least one line sensor among the plural line sensors also reads the at least one of the perforation and the bar code, and during main reading, on the basis of information of the read at least one of the perforation and the bar code, the image frame is positioned at a reading region read by the original reader.

5. An original reading device according to claim 1, wherein the control device sets in advance at least one line sensor among the plural line sensors to be an exclusive-use line sensor, and during preliminary reading, the original is read by the exclusive-use line sensor.

6. An original reading device according to claim 5, further comprising:
   a leading end detecting sensor which is positioned at an upstream side of the original in a direction of relative movement of the original at the time of preliminary reading, and which detects a leading end of the original,
   wherein a line sensor, which is projected onto a plane of movement of the original at a position separated by a predetermined distance from a projection position of the leading end detecting sensor onto the plane of movement of the original, is set to be the exclusive-use line sensor and the control device controls the original reader such that preliminary reading starts from the time the original moves relatively for the predetermined distance from the time the leading end of the original is detected by the leading end detecting sensor.

7. An original reading device according to claim 2, wherein the depth of field of the focusing lens is adjusted by adjusting an aperture of the focusing lens, or by adjusting a focal point position of the focusing lens by moving the focusing lens by the adjusting device.

8. An original reading device according to claim 2, wherein the planarizing device is a presser plate, which presses the original and in which is formed an opening corresponding to the reading region at which the original reader reads the original, or is a blower device for blowing air toward a peak of a convex surface within the reading region at the original which is bent convexly.

9. An original reading device according to claim 3, wherein the first planarizing device is a presser roller for pressing the original at a region other than a region necessary for image reading which is required to read the image on the original.

10. An original reading device according to claim 3, wherein the second planarizing device is a presser plate which presses the original and in which is formed an opening corresponding to a reading region at which the original reader reads the original.

11. An original reading method for an original reading device comprising:

an original reader which is formed by an arrangement of plural line sensors and which reads an original; and a moving device for moving the original and the original reader relatively in a direction in which the plural line sensors are arranged, the original reading method comprising the steps of:
carrying out preliminary reading of the original by at least one line sensor among the plural line sensors in a state in which the original and the original reader are being moved relatively; and
carrying out main reading of the original by the plural line sensors in a state in which the original and the original reader are stopped relatively.

12. An original reading method according to claim 11, wherein the original reading device further comprises:

a focusing lens for focusing the original onto the original reader;

an adjusting device for adjusting a depth of field of the focusing lens; and a planarizing device for making planar a reading region of the original read by the original reader, and the image reading method further comprises the steps of:
during preliminary reading, making the depth of field deep; and
during main reading, making the depth of field shallow and making the reading region planar.

13. An original reading method according to claim 11, wherein the original reading device further comprises:

a first planarizing device for making planar a reading region of the original read by at least one line sensor among the plural line sensors; and a second planarizing device for making planar an entire reading region of the original read by the original reader, and the original reading method further comprises the steps of:
during preliminary reading, the first planarizing device making planar the reading region read by at least one line sensor among the plural line sensors; and
during main reading, the second planarizing device, instead of the first planarizing device, making planar the entire reading region read by the original reader.

14. An original reading method according to claim 11, wherein the original is a photographic photosensitive material on which an image frame is formed and at which at least one of a perforation and a bar code which specify the position of the image frame is formed, and during preliminary reading, at least one line sensor among the plural line sensors also reads the at least one of the perforation and the bar code, and during main reading, on the basis of information of the read at least one of the perforation and the bar code, the image frame is positioned at a reading region read by the original reader.

15. An original reading method according to claim 11, wherein the control device sets in advance at least one line sensor among the plural line sensors to be an exclusive-use line sensor, and during preliminary reading, the original is read by the exclusive-use line sensor.

16. An original reading method according to claim 15, further comprising:

a leading end detecting sensor which is positioned at an upstream side of the original in a direction of relative movement of the original at the time of preliminary reading, and which detects a leading end of the original, wherein a line sensor, which is projected onto a plane of movement of the original at a position separated by a predetermined distance from a projection position of the leading end detecting sensor onto the plane of movement of the original, is set to be the exclusive-use line sensor and the control device controls the original reader such that preliminary reading starts from the time the original moves relatively for the predetermined distance from the time the leading end of the original is detected by the leading end detecting sensor.

17. An original reading device comprising:

an area sensor formed from plural reading elements;

a moving device for moving an original and the area sensor relatively in a predetermined direction of movement; and a control device for controlling the area sensor and the moving device such that the original is subjected to preliminary reading by some of the reading elements of the area sensor in a state in which the original and the area sensor are being moved relatively, and the original is subjected to main reading by the area sensor in a state in which the original and the area sensor are stopped relatively.

18. An original reading device according to claim 17, further comprising:

a first planarizing device for making planar a reading region of the original read by the some of the reading elements of the area sensor; and a second planarizing device for making planar an entire reading region of the original read by the area sensor, wherein the control device controls the first planarizing device and the second planarizing device such that, during preliminary reading, the first planarizing device makes planar the reading region read by the some of the reading elements of the area sensor, and, during main reading, the second planarizing device, instead of the first planarizing device, makes planar the entire reading region read by the area sensor.

19. An original reading device according to claim 17, wherein the original is a photographic photosensitive material on which an image frame is formed and at which at least one of a perforation and a bar code which specify the position of the image frame is formed, and the control device effects control such that, during preliminary reading, the some of the reading elements of the area sensor also read the at least one of the perforation and the bar code, and during main reading, on the basis of information of the read at least one of the perforation and the bar code, the image frame is positioned at a reading region read by the area sensor.

20. An original reading device according to claim 17, wherein the control device sets in advance the some of the reading elements of the area sensor to be exclusive-use reading elements, and during preliminary reading, the original is read by the exclusive-use reading elements.

21. An original reading method of an original reading device which includes an area sensor formed from plural reading elements, and a moving device for moving an original and the area sensor relatively in a predetermined direction of movement, said original reading method comprising the steps of:
   subjecting the original to preliminary reading by some of the reading elements of the area sensor in a state in which the original and the area sensor are being moved relatively; and
   subjecting the original to main reading by the area sensor in a state in which the original and the area sensor are stopped relatively.

22. An original reading device comprising:
   an original reader which is formed by an arrangement of plural line sensors and which reads an original;
   a moving device for moving the original and the original reader relatively in a direction in which the plural line sensors are arranged;
   at least one line sensor disposed at a position which is separated from the original reader at an upstream side of movement of the original in a direction of movement by the moving device;
   a single illuminating device which illuminates light onto a reading region of plural line sensors of the original reader and onto a reading region of the at least one line sensor; and
   a control device for controlling the original reader and the moving device such that preliminary reading of the original is carried out by the at least one line sensor in a state in which the original and the original reader are being moved relatively, and on the basis of results of preliminary reading, the region preliminarily read by the at least one line sensor is positioned at a reading region of the original reader, and in a state in which the region preliminarily read is positioned at the reading region of the original reader, the original and the original reader are stopped relatively and the region preliminarily read is subjected to main reading by plural line sensors of the original reader.

23. An original reading method of an original reading device which includes
   an original reader which is formed by an arrangement of plural line sensors and which reads an original;
   a moving device for moving the original and the original reader relatively in a direction in which the plural line sensors are arranged;
   at least one line sensor disposed at a position which is separated from the original reader at an upstream side of movement of the original in a direction of movement by the moving device; and
   a single illuminating device which illuminates light onto a reading region of plural line sensors of the original reader and onto a reading region of the at least one line sensor,
   said original reading method comprising the steps of:
   subjecting the original to preliminary reading by the at least one line sensor in a state in which the original and the original reader are being moved relatively;
   on the basis of results of preliminary reading, positioning a region preliminarily read by the at least one line sensor at a reading region of the original reader; and
   in a state in which the region preliminarily read is positioned at the reading region of the original reader, stopping the original and the original reader relatively and subjecting the region preliminarily read to main reading by plural line sensors of the original reader.

* * * * *